(12) United States Patent
Maeto

(10) Patent No.: US 11,862,213 B2
(45) Date of Patent: Jan. 2, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Nobuhiro Maeto, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/865,226

(22) Filed: Jul. 14, 2022

(65) Prior Publication Data
US 2023/0274762 A1 Aug. 31, 2023

(51) Int. Cl.
*G11B 5/596* (2006.01)
*G11B 5/54* (2006.01)
*G11B 20/12* (2006.01)

(52) U.S. Cl.
CPC ...... *G11B 5/59644* (2013.01); *G11B 20/1217* (2013.01); *G11B 2020/1281* (2013.01); *G11B 2220/2516* (2013.01)

(58) Field of Classification Search
CPC ... G11B 5/5534; G11B 5/607; G11B 5/59633; G11B 20/10046; G11B 5/56; G11B 5/6009; G11B 2005/0021; G11B 5/012; G11B 20/12
USPC ............................................. 360/31, 48, 75
See application file for complete search history.

(56) References Cited

U.S. PATENT DOCUMENTS

| | | | |
|---|---|---|---|
| 7,298,566 B2 | 11/2007 | Ueda et al. | |
| 7,916,420 B1 | 3/2011 | McFadyen et al. | |
| 9,240,198 B1 * | 1/2016 | Hara | G11B 5/012 |
| 10,049,692 B1 * | 8/2018 | Liu | G11B 5/6029 |

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a disk that has a track including a first servo sector and a second servo sector that is different from the first servo sector, a head that writes data to the disk and reads data from the disk, and a controller that records first signal strength record data related to a signal strength at which first target servo data that is a target of the first servo sector is read, and standardizes first signal strength data related to a signal strength at which the first target servo data is read when the first target servo data is read.

17 Claims, 17 Drawing Sheets

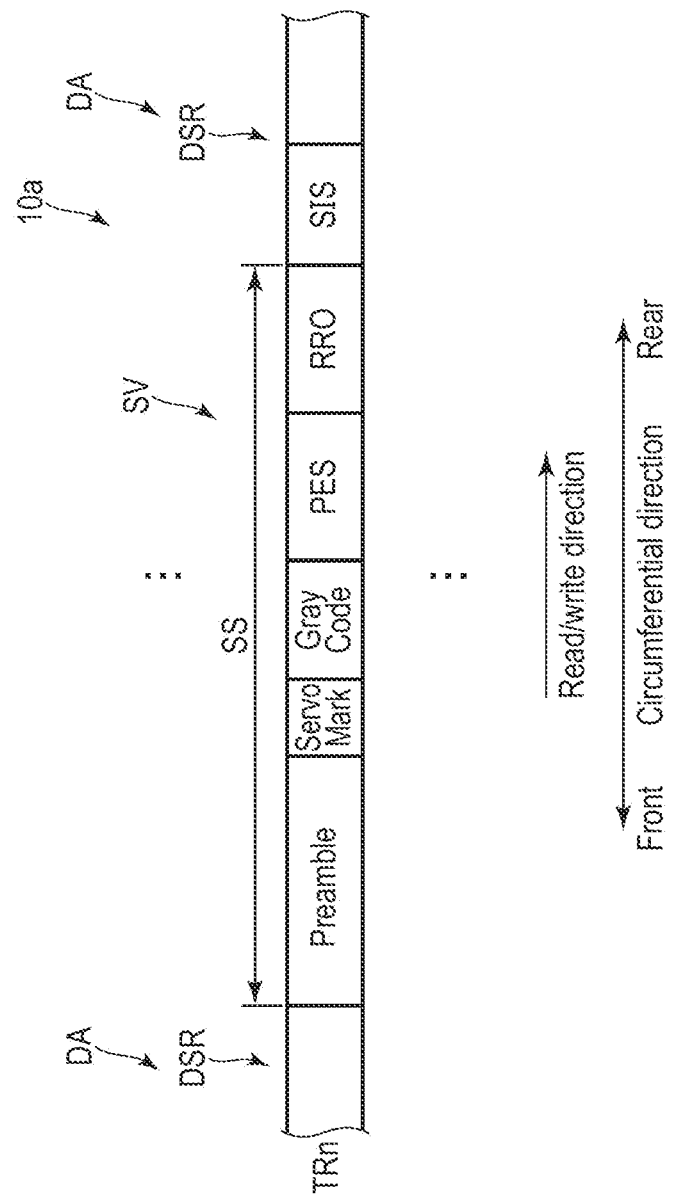
F I G. 3

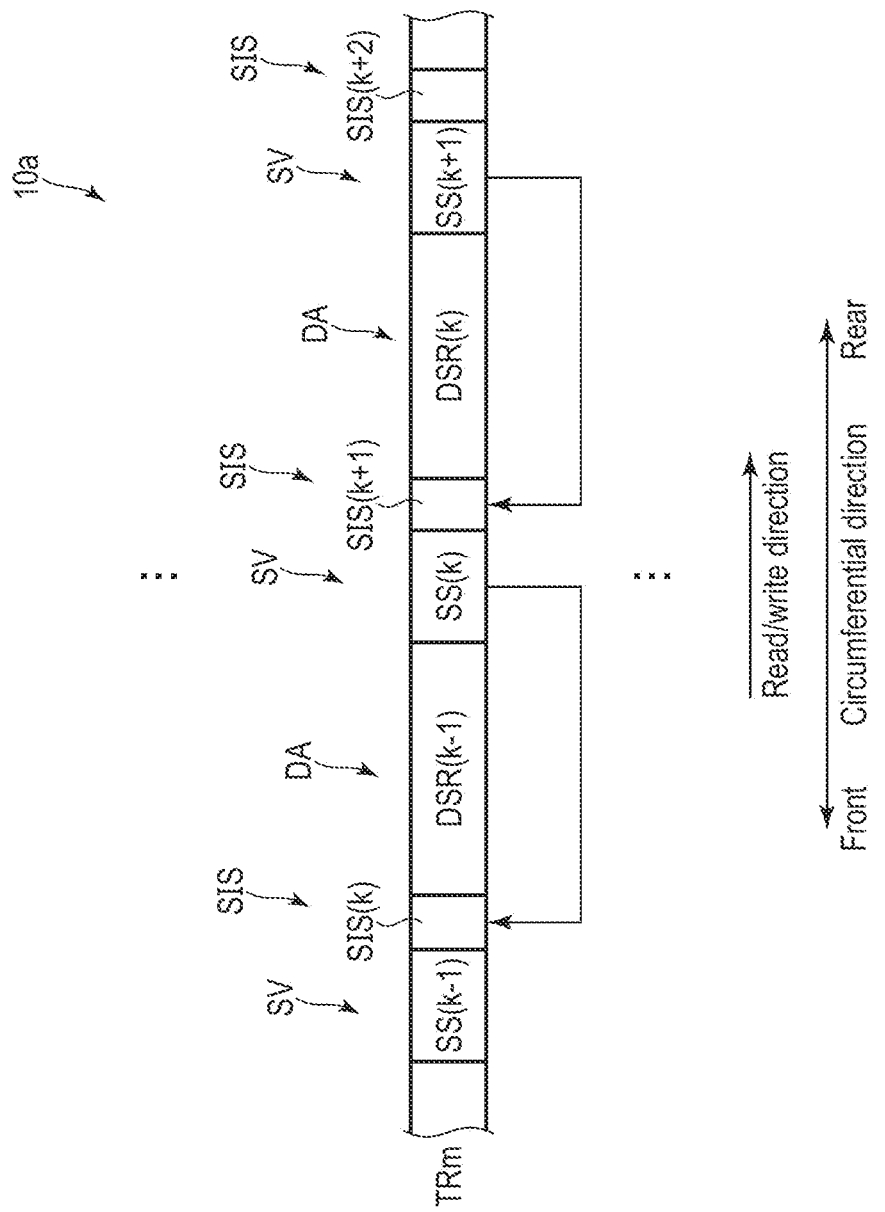
F I G. 6

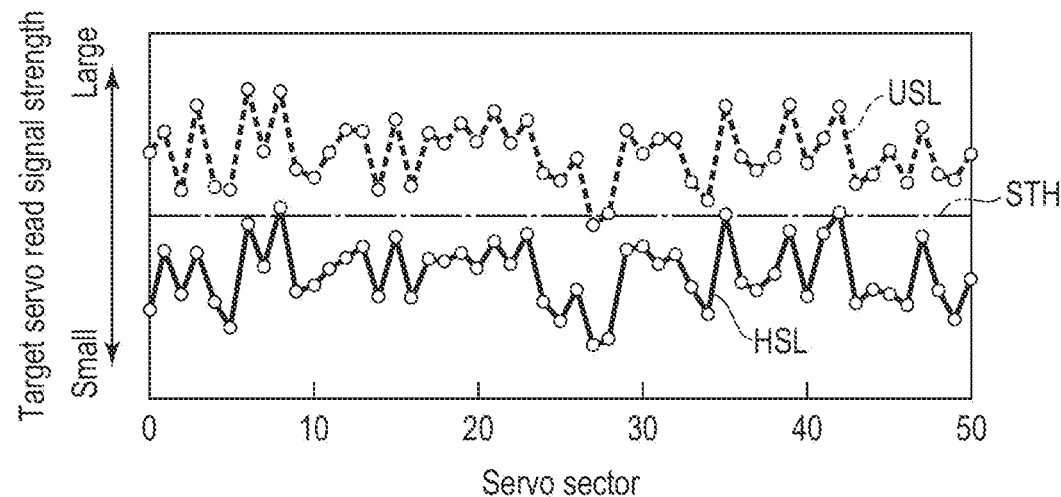
F I G. 8
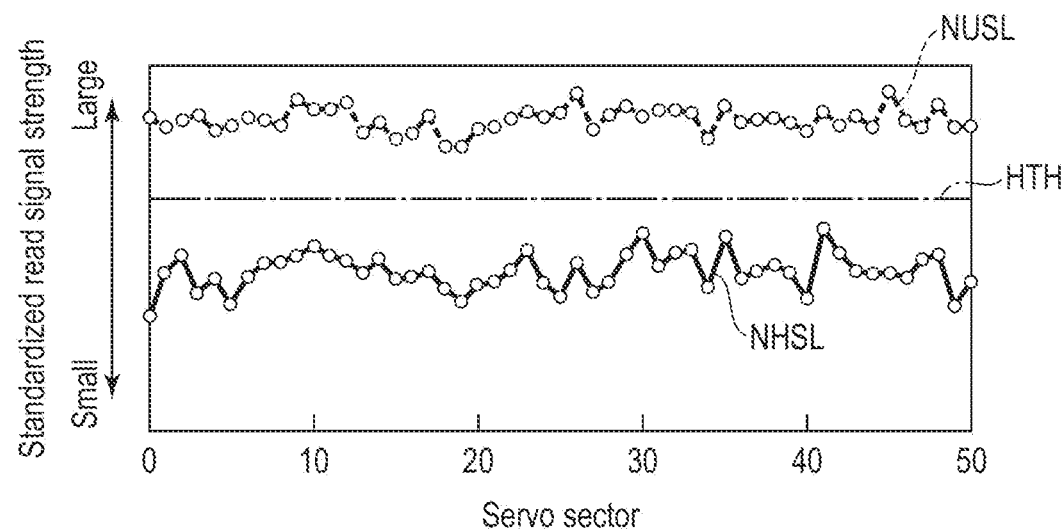
F I G. 9

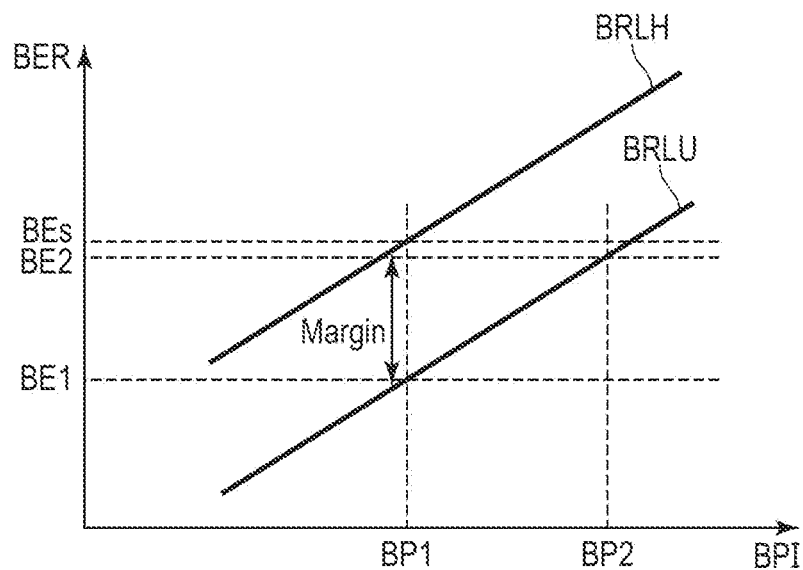
F I G. 10
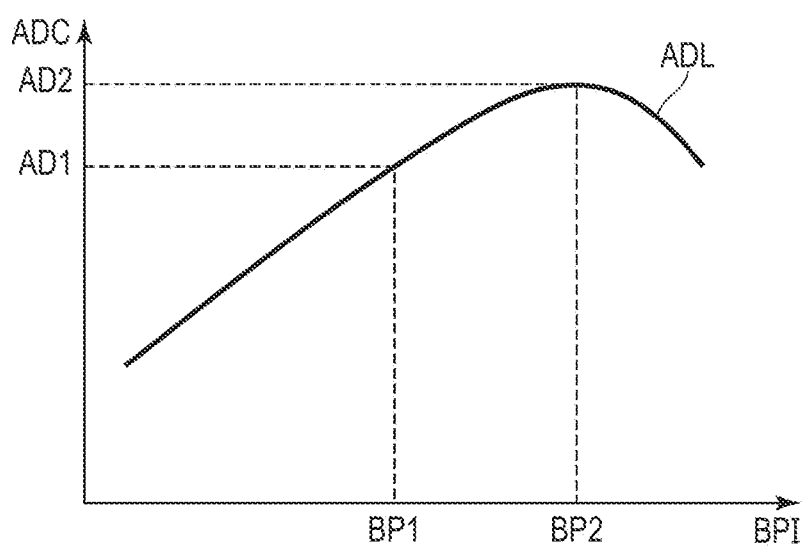
F I G. 11

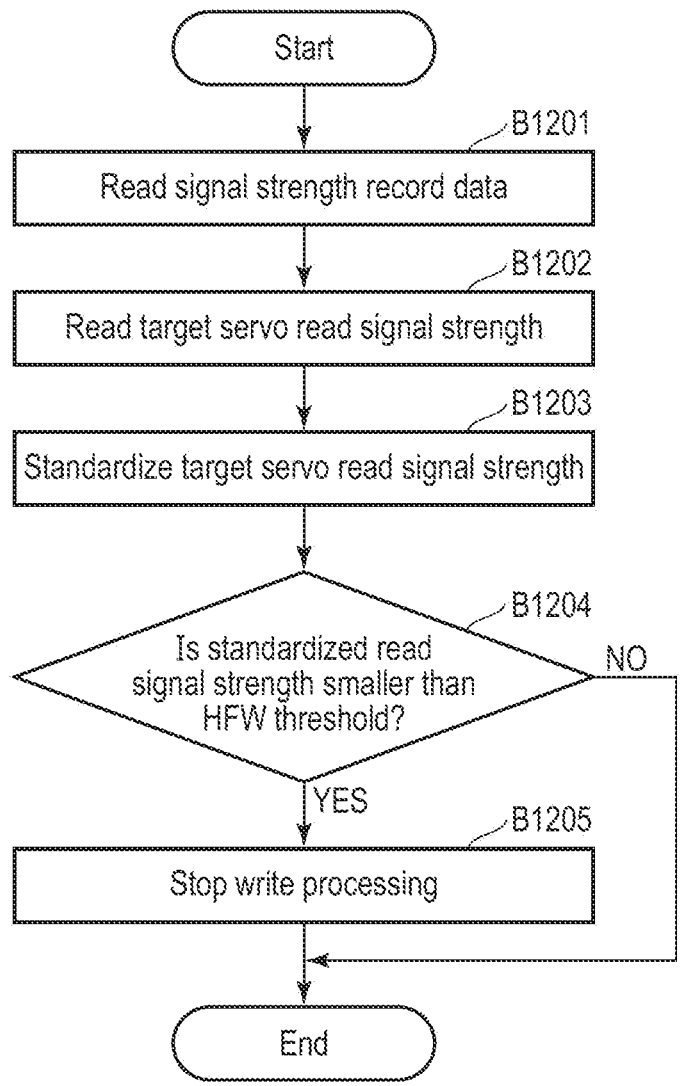
F I G. 12

MAGNETIC DISK DEVICE

CROSS-REFERENCE TO RELATED APPLICATIONS

This application is based upon and claims the benefit of priority from Japanese Patent Application No. 2022-028065, filed Feb. 25, 2022, the entire contents of which are incorporated herein by reference.

FIELD

Embodiments described herein relate generally to a magnetic disk device.

BACKGROUND

The magnetic disk device controls an interval (hereinafter, flying height) between the head and the disk. In the magnetic disk device, the head lifts by coming into contact with contamination on the disk, and high fly write (HFW) in which the flying height of the head becomes higher than the normal flying height can occur. When writing is performed on the disk by the head in which HFW occurs, the magnetization of the disk by the writing can become insufficient. Therefore, there is a possibility that a read error occurs when data written by the head in which HFW has occurred is read. In order to avoid such a read error from occurring, it is necessary to secure a margin of a bit error rate (BER) by setting a bit per inch (BPI) lower than an optimum BPI in a magnetic disk device.

Therefore, there is a possibility that loss of areal density capability (ADC) occurs. With recent high track per inch (TPI) of the magnetic disk device, the amplitude of a reproduction signal when a predetermined region is read is weakened. Therefore, the variation in the signal strength for each servo sector of the magnetic disk device is large. In consideration that there is a high-frequency variation for each servo sector, and in addition, the signal strength is accompanied by a minute change every time reproduction is performed by a non-repeatable run-out (NRRO) component, there is a possibility that it becomes difficult to determine, with a threshold, data written by the head 15 having a normal flying height and a high flying height.

BRIEF DESCRIPTION OF THE DRAWINGS

FIG. 3 is a schematic view illustrating an example of a configuration of a servo sector and a data sector region according to the first embodiment.

FIG. 6 is a schematic view illustrating an example of arrangement of signal strength record data SIS according to the first embodiment.

FIG. 8 is a schematic view illustrating an example of a change in a target servo reproduction signal strength of a target servo reproduction signal of each servo sector with respect to each servo sector in a case of reading each servo sector written by the head with a normal flying height and a high flying height.

FIG. 9 is a schematic view illustrating an example of a change in each standardized reproduction signal strength corresponding to each servo sector with respect to each servo sector in a case of reading each servo sector written by the head with a normal flying height and a high flying height.

FIG. 10 is a schematic view illustrating an example of a change in BER with respect to BPI.

FIG. 11 is a schematic view illustrating an example of a change in ADC with respect to BPI.

FIG. 12 is a flowchart illustrating an example of the HFW detection method according to the first embodiment.

DETAILED DESCRIPTION

Embodiments will be described hereinafter with reference to the accompanying drawings.

In general, according to one embodiment, a magnetic disk device includes a disk that has a track including a first servo sector and a second servo sector that is different from the first servo sector, a head that writes data to the disk and reads data from the disk, and a controller that records first signal strength record data related to a signal strength at which first target servo data that is a target of the first servo sector is read, and standardizes first signal strength data related to a signal strength at which the first target servo data is read when the first target servo data is read.

Embodiments will be described below with reference to the drawings. The drawings are merely examples, and do not limit the scope of the invention.

First Embodiment

Figure 1:
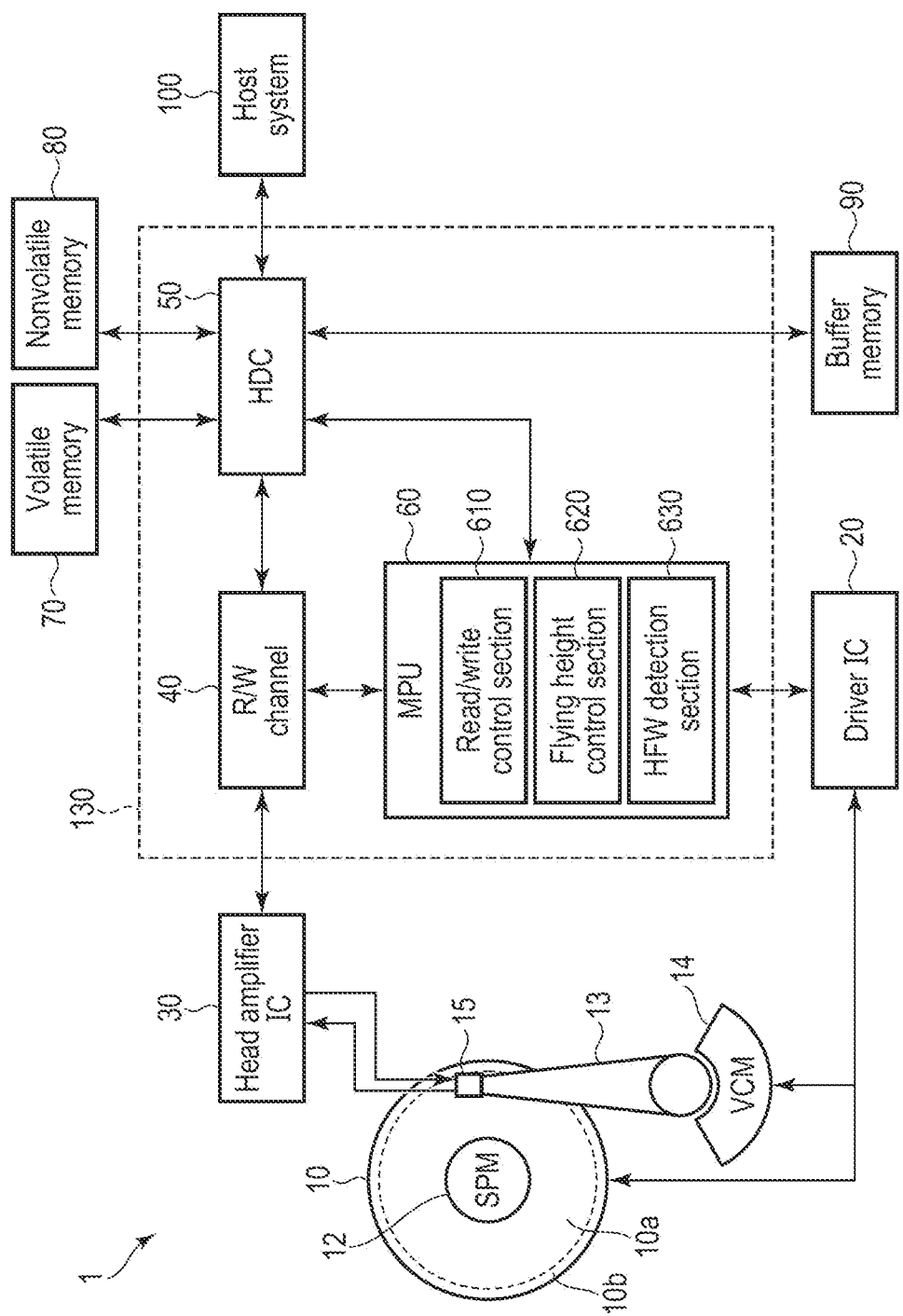
FIG. 1 is a block diagram illustrating a configuration of a magnetic disk device according to a first embodiment.

FIG. 1 is a block diagram illustrating the configuration of a magnetic disk device 1 according to the first embodiment.

The magnetic disk device 1 includes a head disk assembly (HDA) described later, a driver IC 20, a head amplifier integrated circuit (hereinafter, head amplifier IC or preamplifier) 30, a volatile memory 70, a nonvolatile memory 80, a buffer memory (buffer) 90, and a system controller 130 that is a one-chip integrated circuit. The magnetic disk device 1 is connected to a host system (hereinafter, simply referred to as host) 100. Note that the magnetic disk device 1 may be a two-dimensional magnetic recording (TDMR) magnetic disk device or the like having a plurality of read heads 15R in a head 15.

The HDA includes a magnetic disk (hereinafter, referred to as disk) 10, a spindle motor (hereinafter, referred to as SPM) 12, an arm 13 on which the head 15 is mounted, and a voice coil motor (hereinafter, referred to as VCM) 14. The disk 10 is attached to the SPM 12 and rotates by drive of the SPM 12. The arm 13 and the VCM 14 constitute an actuator. By drive of the VCM 14, the actuator controls movement of the head 15 mounted on the arm 13 to a predetermined position of the disk 10. Two or more of the disks 10 and the heads 15 may be provided. Two or more actuators may also be provided.

In the disk 10, a user data region 10a available from a user and a system area 10b in which information necessary for system management is written are allocated to a region in which the data can be written. Note that as a region different from the user data region 10a and the system area 10b, a media cache (or sometimes referred to as media cache region) that temporarily holds data (or a command) transferred from the host or the like before being written to a predetermined region of the user data region 10a may be allocated to the disk 10. Hereinafter, a direction from the inner circumference toward the outer circumference of the disk 10 or a direction from the outer circumference toward the inner circumference of the disk 10 is referred to as a radial direction. In the radial direction, a direction from the inner circumference toward the outer circumference is referred to as an outer direction (or outside), and a direction from the outer circumference toward the inner circumference, that is, a direction opposite to the outer direction is referred to as an inner direction (or inside). A direction orthogonal to the radial direction of the disk 10 is referred to as a circumferential direction. That is, the circumferential direction corresponds to a direction along the circumference of the disk 10. A predetermined position of the disk 10 in the radial direction is sometimes referred to as radial position, and a predetermined position of the disk 10 in the circumferential direction is sometimes referred to as circumferential position. The radial position and the circumferential position are sometimes collectively referred to simply as a position. The disk 10 is divided into a plurality of regions (hereinafter, referred to as a zone or a zone region) for each predetermined range in the radial direction. The zone includes a plurality of tracks. The track includes a plurality of sectors. Note that the "track" is used in various meanings such as a region among a plurality of regions into which the disk 10 is divided for each predetermined range in the radial direction, data written in a region among a plurality of regions into which the disk 10 is divided for each predetermined range in the radial direction, a region extending in the circumferential direction at a predetermined radial position of the disk 10, data written in a region extending in the circumferential direction at a predetermined radial position of the disk 10, a region for a circle of a predetermined radial position of the disk 10, data for a circle written in a region for a circle of a predetermined radial position of the disk 10, a path of the head 15 positioned and written at a predetermined radial position of the disk 10, data written by the head 15 positioned at a predetermined radial position of the disk 10, and data written in a predetermined track of the disk 10. The "sector" is used in various meanings such as a region among a plurality of regions into which a predetermined track of the disk 10 is divided in the circumferential direction, data written in a region among a plurality of regions into which a predetermined track of the disk 10 is divided in the circumferential direction, a region of a predetermined circumferential position at a predetermined radial position of the disk 10, data written in a region of a predetermined circumferential position at a predetermined radial position of the disk 10, and data written in a predetermined sector of the disk 10. The "radial width of the track" is sometimes referred to as "track width". The center position of the track width is sometimes referred to as track center. The track center is sometimes simply referred to as track.

The head 15 includes a write head 15W, the read head 15R, and a heater (heat generation element) 15H mounted on a slider as a main body. The write head 15W writes data on the disk 10. For example, the write head 15W writes a predetermined track or a predetermined sector onto the disk 10. Hereinafter, "to write data" is sometimes referred to as "data write", "write processing", or the like. The read head 15R reads data recorded on the disk 10. For example, the read head 15R reads a predetermined track or a predetermined sector of the disk 10. Hereinafter, "to read data" is sometimes referred to as "data read", "read processing", or the like. Note that the "write head 15W" is sometimes simply referred to as the "head 15", and the "read head 15R" is sometimes simply referred to as the "head 15". The "write head 15W and read head 15R" are sometimes collectively referred to as the "head 15". The "center part of the head 15" is sometimes referred to as the "head 15", the "center part of the write head 15W" is sometimes referred to as the "write head 15W", and the "center part of the read head 15R" is sometimes referred to as the "read head 15R". The "center part of the write head 15W" is sometimes referred to as the "head 15", and the "center part of the read head 15R" is sometimes referred to as the "head 15". To "position center part of the head 15 at a predetermined position" is sometimes expressed as to "position the head 15 at a predetermined position", to "arrange the head 15 at a predetermined position", to "locate the head 15 in a predetermined position", or the like. To "position the center part of the head 15 at a target position of a predetermined region (hereinafter, sometimes referred to as region target position), for example, to position the center part of the head 15 at a radial center of the predetermined region" is sometimes expressed as to "position the head 15 at a predetermined region", to "arrange the head 15 at a predetermined region", to "locate the head 15 at a predetermined region", to "position at a predetermined region", to "arrange at a predetermined region", to "locate at a predetermined region", or the like. To "position the center part of the head 15 at a target position of a predetermined region (hereinafter, sometimes referred to as track target position), for example, to position the center part of the head 15 at a track center" is sometimes expressed as to "position the head 15 at a predetermined track", to "arrange the head 15 at a predetermined track", to "locate the head 15 at a predetermined track", to "position at a track", to "arrange at a track", to "locate at a track", or the like. The heater 15H generates heat by being supplied with power. The heater 15H may be separately provided in the vicinity of the write head 15W and in the vicinity of the read head 15R. In a case where the magnetic disk device 1 is a TDMR type magnetic disk device, the head 15 may include one write head 15W, a plurality of read heads 15R, and at least one heater 15H.

Figure 2:
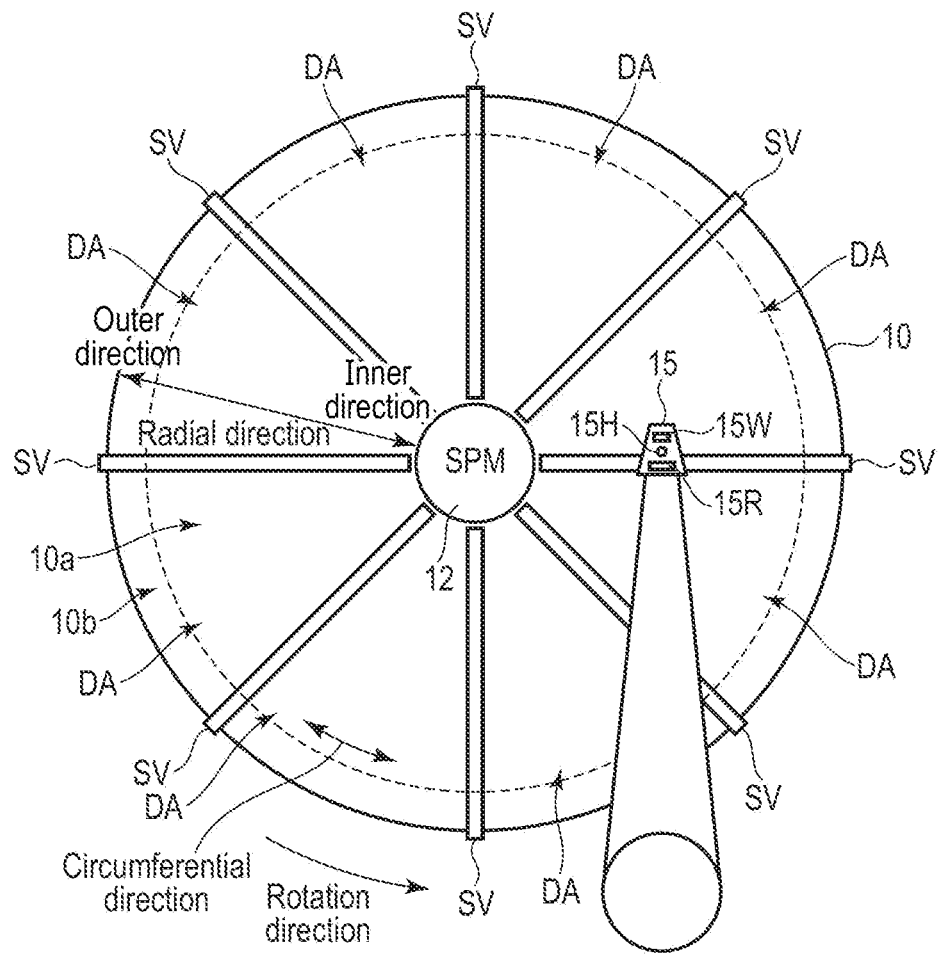
FIG. 2 is a schematic view illustrating an example of a configuration of a disk according to the first embodiment.

FIG. 2 is a schematic view illustrating an example of the configuration of the disk 10 according to the present embodiment. As illustrated in FIG. 2, in the circumferential direction, a direction in which the disk 10 rotates is referred to as a rotation direction. In the example illustrated in FIG.

2, the rotation direction is indicated in the anticlockwise direction, but may be in the opposite direction (clockwise direction).

The disk 10 has a plurality of servo regions SV and a plurality of data regions DA. For example, the plurality of servo regions SV may extend radially in the radial direction of the disk 10 and may be discretely arranged at predetermined intervals in the circumferential direction. For example, the plurality of servo regions SV may extend spirally from the inner circumference to the outer circumference or from the outer circumference to the inner circumference, and may be discretely arranged at predetermined intervals in the circumferential direction. For example, the plurality of servo regions SV may be arranged in an island shape in the radial direction and may be discretely arranged at predetermined intervals varying in the circumferential direction. Hereinafter, "one servo region SV in a predetermined track" is sometimes referred to as "servo sector". That is, the servo region SV has at least one servo sector. Note that the "servo region SV" is sometimes referred to as "servo sector SV". The servo sector includes servo data. Hereinafter, the "arrangement and the like of several servo data constituting a servo sector" is sometimes referred to as "servo pattern". Note that the "servo data written in a servo sector" is sometimes referred to as "servo sector".

Each of the plurality of data regions DA is arranged between the plurality of servo regions SV. For example, the data region DA corresponds to a region between two consecutive servo regions SV in the circumferential direction. Note that the "one data region DA in a predetermined track" is sometimes referred to as "data sector region". That is, the data region DA has at least one data sector region. Note that the "data region DA" is sometimes referred to as "data sector region DA". The data sector region includes at least one sector. The "data sector region" is sometimes referred to as "sector". Note that "data written in a data sector region" is sometimes referred to as "data sector region".

The head 15 rotates about a rotation axis by drive of the VCM 14 with respect to the disk 10 and moves to a predetermined position from the inner direction toward the outer direction, or moves from the outer direction toward the inner direction.

FIG. 3 is a schematic view illustrating an example of the configuration of a servo sector SS and a data sector region DSR according to the present embodiment. FIG. 3 illustrates the predetermined servo sector SS and the data sector region DSR written in a predetermined track TRn of the disk 10. As illustrated in FIG. 3, in the circumferential direction, a direction toward a tip of a front arrow is referred to as a front (or front direction), and a direction toward a tip of a rear arrow is referred to as a rear (or rear direction). For example, in the circumferential direction, a direction to read/write (read/write direction) corresponds to a direction from the front direction toward the rear direction. The read/write direction may correspond to a direction from the rear direction toward the front direction. The read/write direction corresponds to a direction opposite to the rotation direction illustrated in FIG. 2, for example.

The servo sector SS includes servo data, for example, a preamble, a sync mark, a gray code, a position error signal (PES), a repeatable run-out (RRO), and the like. Note that the servo sector SS may include servo data other than the preamble, the sync mark, the gray code, the PES, and the RRO. In the servo sector SS, the preamble, the sync mark, the gray code, the PES, and the RRO are continuously arranged in this order from the front to the rear in the circumferential direction. The preamble includes preamble information for synchronization with a reproduction signal of a servo pattern including the sync mark and the gray code. The sync mark includes sync mark information indicating the start of the servo pattern. The gray code includes an address (cylinder address) of a predetermined track and an address of a servo sector of the predetermined track. The PES corresponds to data corresponding to a tracking position error signal. The RRO is data related to eccentricity of the disk 10. For example, the RRO corresponds to a path that is a target (hereinafter, sometimes referred to as target path) of the head 15 arranged concentrically with the disk 10 caused by blurring (repeatable run-out: RRO) synchronized with rotation of the disk 10 when servo data is written into the disk, for example, data corresponding to an error caused by track distortion with respect to a track center.

In the example illustrated in FIG. 3, the data sector region DSR includes a region or data (hereinafter, sometimes referred to as signal strength target region or signal strength target servo data) that is a target of the predetermined servo sector SS when the servo sector SS is read in a region (hereinafter, sometimes referred to as signal strength record region) adjacent to the servo sector SS, for example, data (hereinafter, sometimes referred to as signal strength record data) SIS related to the signal strength of a reproduction signal (hereinafter, sometimes referred to as target servo reproduction signal) corresponding to a part or entirety of the servo sector SS. Note that the signal strength record region may be included in the servo sector SS or may be included in a region other than the data sector region DSR and the servo sector SS. The "signal strength record data SIS" is sometimes referred to as "signal strength record region SIS". The "signal strength record region SIS" is sometimes referred to as "signal strength record data SIS". Hereinafter, the "signal strength target region", the "signal strength target servo data", and the "part or entirety of the servo sector SS" are sometimes simply referred to as the "servo sector SS". The signal strength record region is adjacent to the servo sector SS in the read/write direction. In other words, the signal strength record region is adjacent immediately after the servo sector SS. For example, the signal strength record region is adjacent immediately after the RRO of the servo sector SS. Note that the signal strength record region needs not be adjacent to the servo sector SS in the read/write direction. The signal strength record region needs not be adjacent to the servo sector SS. For example, the signal strength record region needs not be adjacent to the RRO of the servo sector SS. The term "adjacent" includes not only meanings such as "continuous" and "arranged side by side in contact with each other" in a predetermined direction but also meanings such as "separated to such an extent as to be regarded as substantially continuous". The signal strength record data SIS is adjacent to the servo sector SS in the read/write direction. In other words, the signal strength record data SIS is adjacent immediately after the servo sector SS. For example, the signal strength record data SIS is adjacent immediately after the RRO of the servo sector SS. Note that the signal strength record data SIS needs not be adjacent to the servo sector SS in the read/write direction. The signal strength record data SIS needs not be adjacent to the servo sector SS. For example, the signal strength record data SIS needs not be adjacent to the RRO of the servo sector SS. For example, the signal strength target region, the signal strength target servo data, and the signal strength record data SIS are servo data that can always obtain a same read signal (or reproduction signal) for which rewrite processing of rewriting data of a predetermined region to this region or the like is not executed. Terms such as "same", "identical", "match", and "equivalent" include not only the meaning of exactly the same but also the meaning of being different to an extent that can be regarded as being substantially the same. The signal strength record data SIS is data related to the signal strength when the signal strength target region (or the signal strength target servo data) is read. The signal strength record data SIS is a value obtained by performing Fourier transform on the target servo reproduction signal, for example. The signal strength record data SIS is a value obtained by performing Fourier transform on and dividing each of, for example, the target servo reproduction signal and an ideal signal or a demodulated signal. The signal strength record data SIS is, for example, a ½ subharmonic after the Fourier transform of the preamble that is a 2T pattern, and is a fundamental frequency or an n-th harmonic obtained by performing the Fourier transform on and dividing the reproduction signal (target servo reproduction signal) of sync mark/gray code/RRO and the ideal signal or the demodulated signal. The signal strength record data SIS is an amplitude of the target servo reproduction signal, for example (hereinafter, sometimes referred to as target servo reproduction signal amplitude).

Note that the plurality of servo sectors SS may include a normal servo sector (hereinafter, normal servo sector) and a short servo sector. The normal servo sector corresponds to, for example, the servo sector SS illustrated in FIG. 3. For example, the short servo sector has less servo data to be read than that of the normal servo sector, has a smaller number of servo data than that of the normal servo sector, and has a length smaller than the circumferential length of the normal servo sector. When the plurality of servo sectors SS include the normal servo sector and the short servo sector, the signal strength record region may be arranged immediately after the read/write direction of the normal servo sector, and needs not be arranged between the short servo sector and a next servo sector in the read/write direction of this short servo sector. In other words, when the plurality of servo sectors SV include the normal servo sector and the short servo sector, the signal strength record region is adjacent in the read/write direction of the normal servo sector and is not adjacent in the read/write direction of the short servo sector. When the plurality of servo sectors SS include the normal servo sector and the short servo sector, the signal strength record data SIS may be written immediately after the read/write direction of the normal servo sector, and needs not be written between the short servo sector and a next servo sector in the read/write direction of this short servo sector. In other words, when the plurality of servo sectors SS include the normal servo sector and the short servo sector, the signal strength record data SIS is adjacent in the read/write direction of the normal servo sector and is not adjacent in the read/write direction of the short servo sector.

Figure 4:
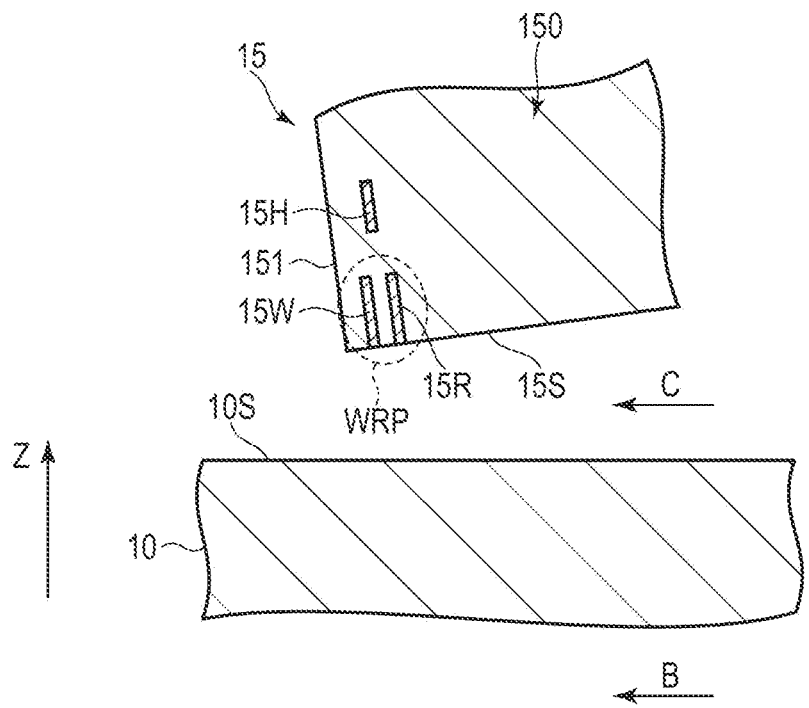
FIG. 4 is a schematic view illustrating an example of a disk and a head before expansion.

FIG. 4 is a schematic view illustrating an example of the disk 10 and the head 15 before expansion. In FIG. 4, a rotation direction B of the disk 10 matches the direction of an air flow C. FIG. 4 illustrates a direction Z corresponding to a thickness or a height direction. Hereinafter, a direction from the head 15 toward the disk 10 in the direction Z is sometimes referred to as downward direction (or simply down), and a direction from the disk 10 toward the head 15 in the direction Z is sometimes referred to an upward direction (or simply up).

The head 15 includes a slider 150. The slider 150 is formed of, for example, a sintered body (AlTiC) of alumina and titanium carbide. The slider 150 has a disk opposing surface (air bearing surface (ABS)) 15S opposing a surface 10S of the disk 10, and a trailing end 151 positioned on an outflow side of the air flow C. The slider 150 includes the write head 15W, the read head 15R, and the heater 15H. The write head 15W and the read head 15R are partially exposed to the disk opposing surface 15S.

The write head 15W is magnetized when a recording magnetic field is excited by supplying a current (write current or recording current) of a predetermined magnitude. By changing the magnetization direction of a recording bit of a magnetic recording layer of the disk 10 by a magnetic flux flowing through a magnetized part, the write head 15W records, on the disk 10, a magnetization pattern corresponding to the recording current.

As illustrated in FIG. 4, when the heater 15H does not generate heat, the surrounding (hereinafter, sometimes referred to as record/reproduction part) WRP of the write head 15W and the read head 15R does not protrude toward the disk 10. Hereinafter, an interval between the disk 10 and the head 15, for example, the lowermost part (hereinafter, sometimes referred to as flying lowermost point) of the head 15 (surrounding of the write head 15W and the read head 15R) in the direction Z is sometimes referred to as "flying height".

Figure 5:
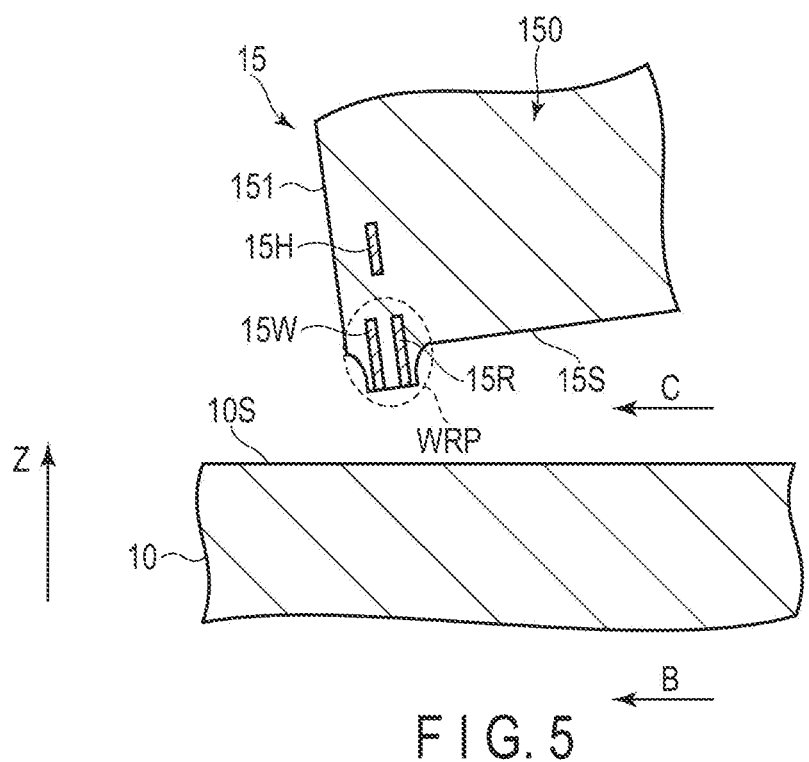
FIG. 5 is a schematic view illustrating an example of a disk and a head after expansion.

FIG. 5 is a schematic view illustrating an example of the disk 10 and the head 15 after expansion.

As illustrated in FIG. 5, when the heater 15H generates heat, the record/reproduction part WRP expands (thermally expands) by the heat of the heater 15H and protrudes toward the disk 10. In this case, the vertex of the thermally expanded record/reproduction part WRP becomes the flying lowermost point of the head 15.

The driver IC 20 controls drive of the SPM 12 and the VCM 14 according to control of the system controller 130 (an MPU 40 described later in detail).

The head amplifier IC (preamplifier) 30 includes a read amplifier and a write driver. The read amplifier amplifies and outputs, to the system controller 130, the read signal read from the disk 10 (a read/write (R/W) channel 40 described later in detail). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each section of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, flash read only memory (FROM) of a NOR type or NAND type.

The buffer memory 90 is a semiconductor memory that temporarily records data and the like transmitted and received between the magnetic disk device 1 and the host 100. The buffer memory 90 may be configured integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is achieved by using, for example, a large-scale integrated circuit (LSI) called a system-on-a-chip (SoC) in which a plurality of elements are integrated on a single chip. The system controller 130 includes the read/write (R/W) channel 40, a hard disk controller (HDC) 50, and a microprocessor (MPU) 60.

The system controller 130 is electrically connected to, for example, the driver IC 20, the head amplifier IC 30, the volatile memory 70, the nonvolatile memory 80, the buffer memory 90, the host 100, and the like.

In response to an instruction from an MPU 60 described later, the R/W channel 40 executes signal processing of data (hereinafter, sometimes referred to as read data) transferred from the disk 10 to the host 100 and data (hereinafter, sometimes referred to as write data) transferred from the host 100. The R/W channel 40 has a circuit or a function for modulating write data. The R/W channel 40 has a circuit or a function of measuring and demodulating the signal quality of read data. The R/W channel 40 is electrically connected to, for example, the head amplifier IC 30, the HDC 50, the MPU 60, and the like.

The HDC 50 controls data transfer. For example, the HDC 50 controls data transfer between the host 100 and the disk 10 in response to an instruction from the MPU 60 described later. The HDC 50 is electrically connected to, for example, the R/W channel 40, the MPU 60, the volatile memory 70, the nonvolatile memory 80, the buffer memory 90, and the like.

The MPU 60 is a main controller that controls each section of the magnetic disk device 1. The MPU 60 controls the VCM 14 via the driver IC 20 to execute servo control for positioning the head 15. The MPU 60 controls the SPM 12 via the driver IC 20 to rotate the disk 10. The MPU 60 controls a write operation of data to the disk 10 and selects a storage destination of data transferred from the host 100, for example, write data. The MPU 60 controls a read operation of data from the disk 10 and controls processing of data transferred from the disk 10 to the host 100, for example, read data. The MPU 60 manages a region in which data is recorded. The MPU 60 is connected to each section of the magnetic disk device 1. The MPU 60 is electrically connected to, for example, the driver IC 20, the R/W channel 40, the HDC 50, and the like.

The MPU 60 includes a read/write control section 610, a flying height control section 620, and a high fly write (HFW) detection section 630. The MPU 60 executes, on firmware, processing of each section, for example, the read/write control section 610, the flying height control section 620, the HFW detection section 630, and the like. The MPU 60 may include, as a circuit, each section, for example, the read/write control section 610, the flying height control section 620, the HFW detection section 630, and the like. The read/write control section 610, the flying height control section 620, the HFW detection section 630, and the like may be included in the R/W channel 40 or the HDC 50.

The read/write control section 610 controls read processing of reading data from the disk 10 and write processing of writing data to the disk 10 according to a command or the like from the host 100. The read/write control section 610 controls the VCM 14 via the driver IC 20, positions the head 15 at a predetermined position on the disk 10, and executes read processing or write processing. Hereinafter, the term "access" is sometimes used in the sense including recording or writing data into a predetermined region (write processing), reading out or reading data from a predetermined region (read processing), and moving the head 15 or the like to a predetermined region.

The flying height control section 620 controls the flying height of the head 15. The flying height control section 620 controls the flying height of the head 15 (for example, the record/reproduction part WRP) by controlling the current applied (or voltage applied) from the head amplifier IC 30 to the heater 15H. The flying height control section 620 controls the flying height of the head 15 to a predetermined flying height (hereinafter, sometimes referred to as normal flying height) at which write processing or read processing of data can be normally performed.

The HFW detection section 630 detects high fly write (HFW). The HFW is an event in which the head 15 comes into contact with contamination occurring in the disk 10 and lifts to a flying height (hereinafter, sometimes referred to as high flying height or abnormal flying height) higher than the normal flying height, and magnetization in the write head 15W becomes insufficient in a predetermined region of the disk 10 for overwriting to the disk 10, so that data cannot be normally written into this region and a read error is caused when this region is read.

The HFW detection section 630 writes or records each signal strength record data SIS corresponding to each servo sector SS as an RRO component for each servo sector SS. The HFW detection section 630 continuously writes the signal strength record data SIS corresponding to the predetermined servo sector SS immediately after in the read/write direction of the predetermined servo sector SS or a servo sector (hereinafter, sometimes referred to as another servo sector) SS different from the predetermined servo sector SS. In other words, the HFW detection section 630 writes the signal strength record data SIS corresponding to the predetermined servo sector SS into the signal strength record region immediately after in the read/write direction of the predetermined servo sector SS or the other servo sector SS.

The HFW detection section 630 may continuously write the signal strength record data SIS corresponding to the predetermined servo sector SS immediately after in the read/write direction of this servo sector SS, or may continuously write the same immediately after in the read/write direction of a servo sector SS other than this servo sector SS. The HFW detection section 630 may record the signal strength record data SIS corresponding to the predetermined servo sector SS into a region other than the signal strength record region immediately after in the read/write direction of this servo sector SS, for example, the disk 10, the volatile memory 70, the nonvolatile memory 80, or the buffer memory 90, or may record the same into a region other than the signal strength record region immediately after in the read/write direction of the servo sector SS other than this servo sector SS, for example, the disk 10, the volatile memory 70, the nonvolatile memory 80, or the buffer memory 90.

For example, in a predetermined track, the HFW detection section 630 continuously writes, immediately after in the read/write direction of the current servo sector SS, the signal strength record data (hereinafter, sometimes referred to as next signal strength record data) SIS corresponding to the servo sector (hereinafter, sometimes referred to as next servo sector) SS to be targeted next arranged second after in the read/write direction of the currently targeted servo sector (hereinafter, sometimes referred to as current servo sector) SS. For example, the HFW detection section 630 may continuously write the signal strength record data (hereinafter, sometimes referred to as current signal strength record data) SIS corresponding to the current servo sector SS immediately after in the read/write direction of the current servo sector SS. Note that HFW detection section 630 may continuously write the current signal strength record data SIS corresponding to the current servo sector SS immediately after in the read/write direction of this current servo sector SS, or may continuously write the same immediately after in the read/write direction of the servo sector SS other than this current servo sector SS. The HFW detection section 630 may write the current signal strength record data SIS corresponding to the current servo sector SS into a region other than the signal strength record region immediately after in the read/write direction of this current servo sector SS, or may write the same into a region other than the signal strength record region immediately after in the read/write direction of the servo sector SS other than this current servo sector SS.

The HFW detection section 630 detects HFW by monitoring a frequency component of the target servo reproduction signal or a ratio of this frequency component during the write processing. In a case of reading a predetermined region where data is written by the head 15 having the high flying height, the amplitude of the reproduction signal when reading this region decreases, and therefore, the frequency component of this reproduction signal decreases or the ratio between the fundamental frequency and the third harmonic of this reproduction signal changes.

When reading the predetermined servo sector SS during the write processing, the HFW detection section 630 standardizes the signal strength (hereinafter, sometimes referred to as target servo reproduction signal strength) of the target servo reproduction signal of this servo sector SS that has just been read. When reading the predetermined servo sector SS during the write processing, the HFW detection section 630 standardizes the target servo reproduction signal strength corresponding to this servo sector SS that has just been read based on the signal strength record data SIS corresponding to this servo sector SS that has been written by reading in advance the target region of this servo sector SS. For example, during the write processing, the HFW detection section 630 standardizes this target servo reproduction signal strength by dividing or subtracting the signal strength record data SIS corresponding to this servo sector SS from the target servo reproduction signal strength corresponding to the predetermined servo sector SS. In other words, during the write processing, the HFW detection section 630 divides or subtracts the signal strength record data SIS corresponding to this servo sector SS from the target servo reproduction signal strength corresponding to the predetermined servo sector SS to calculate the standardized target servo reproduction signal strength (hereinafter, sometimes referred to as standardized reproduction signal strength) corresponding to this servo sector SS.

The signal strength record data SIS corresponding to the predetermined servo sector SS and the target servo reproduction signal strength corresponding to this servo sector SS are signal strengths when the same data in the same region of this servo sector are read at different timings, for example. Note that the signal strength record data SIS corresponding to the predetermined servo sector SS and the target servo reproduction signal strength corresponding to this servo sector SS may be the signal strengths in a case where the same data or different data in the same region or different regions of this servo sector SS are read.

The target servo reproduction signal strength is a value obtained by performing Fourier transform on the target servo reproduction signal similarly to the signal strength record data SIS, for example. Similarly to the signal strength record data SIS, for example, the target servo reproduction signal strength is a value obtained by performing Fourier transform on and dividing each of the target servo reproduction signal and an ideal signal or a demodulated signal. Similarly to the signal strength record data SIS, for example, the target servo reproduction signal strength is a ½ subharmonic after the Fourier transform of the preamble that is a 2T pattern, and is a fundamental frequency or an n-th harmonic obtained by performing the Fourier transform on and dividing the reproduction signal (target servo reproduction signal) of sync mark/gray code/RRO and the ideal signal or the demodulated signal. Similarly to the signal strength record data SIS, for example, the target servo reproduction signal strength is an amplitude of the target servo reproduction signal (hereinafter, sometimes referred to as target servo reproduction signal amplitude).

For example, when reading the current servo sector SS during the write processing, the HFW detection section 630 standardizes the signal strength (hereinafter, sometimes referred to as current target servo reproduction signal strength) of the target servo reproduction signal (hereinafter, sometimes referred to as current target servo reproduction signal) corresponding to the current servo sector that has just been read. When reading the current servo sector SS during the write processing, the HFW detection section 630 standardizes the current target servo reproduction signal strength corresponding to the current servo sector SS based on the current signal strength record data SIS. For example, during the write processing, the HFW detection section 630 standardizes the current target servo reproduction signal strength by dividing or subtracting the current signal strength record data SIS from the current target servo reproduction signal strength corresponding to the current servo sector SS. In other words, during the write processing, the HFW detection section 630 divides or subtracts the current signal strength record data SIS from the current target servo reproduction signal strength corresponding to the current servo sector SS to calculate the standardized current target servo reproduction signal strength (hereinafter, sometimes referred to as current standardized reproduction signal strength).

The HFW detection section 630 determines whether the standardized reproduction signal strength corresponding to the predetermined servo sector SS is smaller than a threshold (hereinafter, sometimes referred to as HFW threshold) or equal to or greater than the HFW threshold (or equal to or less than the HFW threshold or larger than the HFW threshold). For example, the HFW detection section 630 determines whether the current standardized reproduction signal strength corresponding to the current servo sector SS is smaller than the HFW threshold or equal to or greater than the HFW threshold (or equal to or less than the HFW threshold or larger than the HFW threshold).

If determining that the standardized reproduction signal strength corresponding to the predetermined servo sector SS is smaller than the HFW threshold (or equal to or less than the HFW threshold), the HFW detection section 630 determines that HFW occurs in a predetermined region of the disk 10. If determining that the standardized reproduction signal strength corresponding to the predetermined servo sector SS is equal to or greater than the HFW threshold (or larger than the HFW threshold), the HFW detection section 630 determines that HFW does not occur in a predetermined region of the disk 10. For example, if determining that the current standardized reproduction signal strength corresponding to the current servo sector is smaller than the HFW threshold (or equal to or less than the HFW threshold), the HFW detection section 630 determines that HFW occurs in a predetermined region of the disk 10. If determining that the current standardized reproduction signal strength corresponding to the current servo sector is equal to or greater than the HFW threshold (or larger than the HFW threshold), the HFW detection section 630 determines that HFW does not occur in a predetermined region of the disk 10.

Note that if determining that the standardized reproduction signal strength corresponding to the predetermined servo sector SS is greater than the HFW threshold (or equal to or greater than the HFW threshold), the HFW detection section 630 may determine that HFW occurs in a predetermined region of the disk 10. If determining that the standardized reproduction signal strength corresponding to the predetermined servo sector SS is equal to or less than the HFW threshold (or smaller than the HFW threshold), the HFW detection section 630 may determine that HFW occurs in a predetermined region of the disk 10.

If determining that HFW occurs in a predetermined region of the disk 10, the HFW detection section 630 stops the write operation in the predetermined region of the disk 10. For example, if determining that HFW occurs in a predetermined region of the disk 10, the HFW detection section 630 stops the write operation in the predetermined region of the disk 10 and executes rewrite processing on the predetermined region of the disk 10.

For example, if determining that HFW occurs in the predetermined region of the disk 10 based on the standardized reproduction signal strength corresponding to the predetermined servo sector SS, the HFW detection section 630 stops the write operation in the predetermined region of the disk 10 and executes rewrite processing on the predetermined region of the disk 10. For example, if determining that HFW occurs in the predetermined region of the disk 10 based on the signal strength record data corresponding to the predetermined servo sector SS, the HFW detection section 630 stops the write operation in the predetermined region of the disk 10 and executes rewrite processing on the data sector region DSR immediately before this servo sector SS.

For example, if determining that HFW occurs in the predetermined region of the disk 10, the HFW detection section 630 stops the write operation in the predetermined region of the disk 10, and executes processing (hereinafter, sometimes referred to as saving processing) of recording or storing data in the predetermined region of the disk 10 in another alternative region, for example, the disk 10, the volatile memory 70, the nonvolatile memory 80, or the buffer memory 90.

For example, if determining that HFW occurs in the predetermined region of the disk 10 based on the standardized reproduction signal strength corresponding to the predetermined servo sector SS, the HFW detection section 630 stops the write operation in the predetermined region of the disk 10, and executes the saving processing of the data in the predetermined region of the disk 10 to another alternative region, for example, the disk 10, the volatile memory 70, the nonvolatile memory 80, or the buffer memory 90. For example, when HFW detection section 630 determines that HFW occurs in the predetermined region of the disk 10 based on the signal strength record data corresponding to the predetermined servo sector SS, the write operation is stopped in the predetermined region of the disk 10, and the data of the data sector region DSR immediately before the servo sector SS is saved in another alternative region, for example, the disk 10, the volatile memory 70, the nonvolatile memory 80, or the buffer memory 90.

FIG. 6 is a schematic view illustrating an example of arrangement of the signal strength record data SIS according to the present embodiment. FIG. 6 illustrates a track TRm. The track TRm includes servo sectors SS (k−1), SS (k), and SS (k+1), and signal strength record data SIS (k), SIS (k+1), and SIS (k+2). In FIG. 6, the servo sectors SS (k−1), SS (k), and SS (k+1) are arranged at intervals in the read/write direction in the described order. In other words, the servo sector SS (k) is arranged at intervals in the read/write direction of the servo sector SS (k−1). The servo sector SS (k+1) is arranged at intervals in the read/write direction of the servo sector SS (k). In FIG. 6, the signal strength record data SIS (k), SIS (k+1), and SIS (k+2) are arranged at intervals in the read/write direction in the described order. In other words, the signal strength record data SIS (k+1) is arranged at intervals in the read/write direction of the signal strength record data SIS (k). The signal strength record data SIS (k+2) is arranged at intervals in the read/write direction of the signal strength record data SIS (k+1). The signal strength record data SIS (k) is arranged between the servo sectors SS (k−1) and SS (k), and is adjacent in the read/write direction of the servo sector SS (k−1). The signal strength record data SIS (k) corresponds to the servo sector SS (k). The signal strength record data SIS (k+1) is arranged between the servo sectors SS (k) and SS (k+1), and is adjacent in the read/write direction of the servo sector SS (k). The signal strength record data SIS (k+1) corresponds to the servo sector SS (k+1). The signal strength record data SIS (k+2) is adjacent in the read/write direction of the servo sector SS (k+1). The signal strength record data SIS (k+2) corresponds to the servo sector SS (k+2) next to the servo sector SS (k+1) not illustrated.

In the example illustrated in FIG. 6, in the track TRm, the MPU 60 writes the signal strength record data SIS (k) adjacent in the read/write direction of the servo sector SS (k−1), writes the signal strength record data SIS (k+1) adjacent in the read/write direction of the servo sector SS (k), and writes the signal strength record data SIS (k+2) adjacent in the read/write direction of the servo sector SS (k+1). In other words, in the track TRm, the MPU 60 writes the signal strength record data SIS (k) immediately after the servo sector SS (k−1), writes the signal strength record data SIS (k+1) immediately after the servo sector SS (k), and writes the signal strength record data SIS (k+2) immediately after the servo sector SS (k+1).

Figure 7:
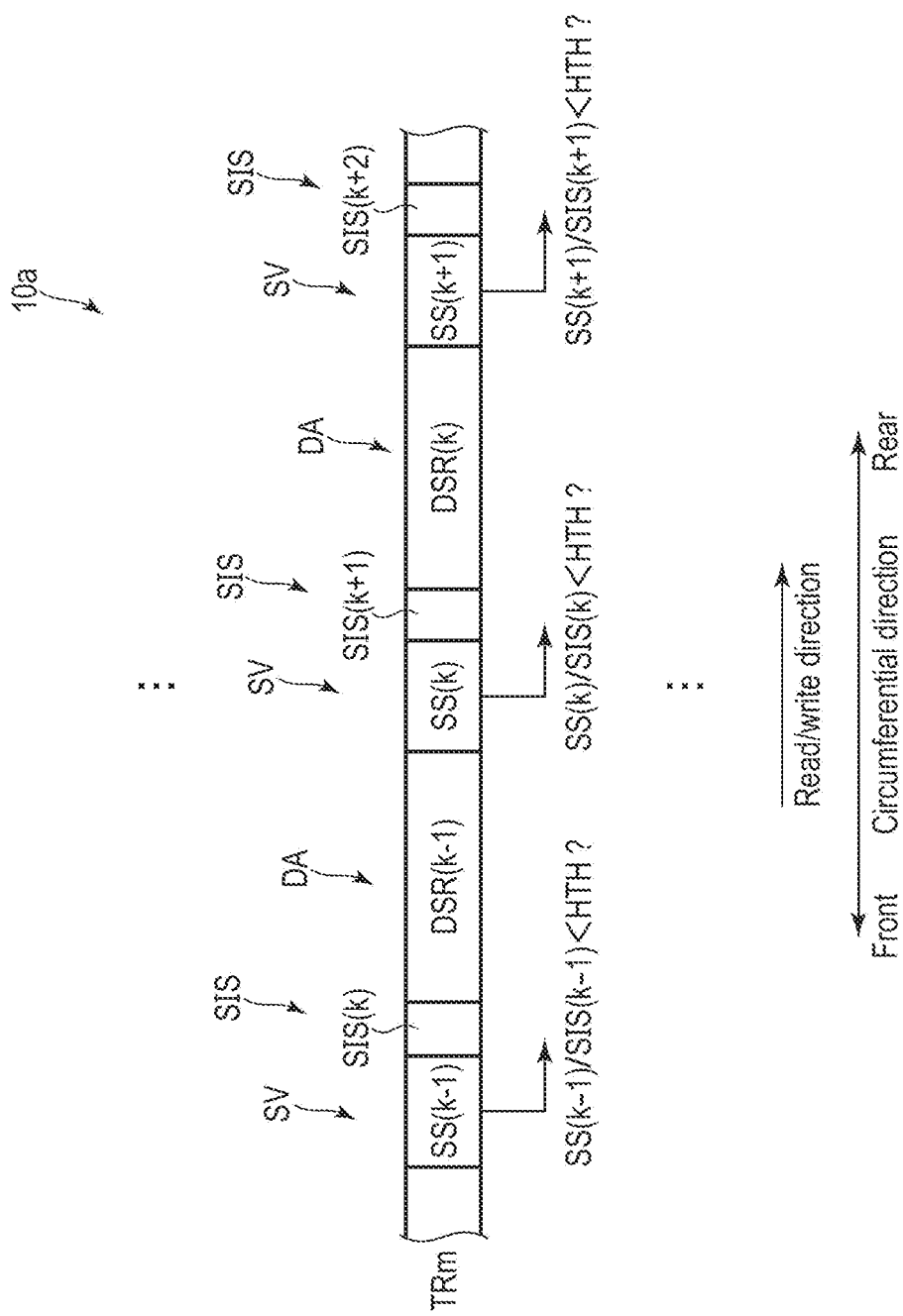
FIG. 7 is a schematic view illustrating an example of an HFW detection method according to the first embodiment.

FIG. 7 is a schematic view illustrating an example of the HFW detection method according to the present embodiment. The track TRm illustrated in FIG. 7 corresponds to the track TRm illustrated in FIG. 6. FIG. 7 illustrates an HFW threshold HTH. In FIG. 7, the signal strength record data SIS (k−1) corresponds to the signal strength record data corresponding to the servo sector SS (k−1).

In the example illustrated in FIG. 7, the MPU 60 reads the signal strength record data SIS (k−1) corresponding to the servo sector SS (k−1) during the write processing of the track TRm. The MPU 60 reads the target servo reproduction signal strength corresponding to the servo sector SS (k−1). The MPU 60 standardizes the target servo reproduction signal strength corresponding to the servo sector SS (k−1) to the standardized reproduction signal strength based on the signal strength record data SIS (k−1) corresponding to the servo sector SS (k−1). The MPU 60 determines whether the standardized reproduction signal strength corresponding to the servo sector SS (k−1) is smaller than the HFW threshold HTH or equal to or greater than the HFW threshold.

In the example shown in FIG. 7, if determining that the standardized reproduction signal strength corresponding to the servo sector SS (k−1) is smaller than the HFW threshold HTH, the MPU 60 stops the write operation in a data sector region DSR (k−1) corresponding to the servo sector SS (k−1) of the disk 10, and executes rewrite processing on the data sector region DSR (k−1) corresponding to the servo sector SS (k−1).

In the example illustrated in FIG. 7, during the write processing, the MPU 60 reads the target servo reproduction signal strength of the servo sector SS (k−1) and reads the signal strength record data SIS (k). The MPU 60 reads the target servo reproduction signal strength of the servo sector SS (k) during the write processing. The MPU 60 standardizes the target servo reproduction signal strength corresponding to the servo sector SS (k) to the standardized reproduction signal strength based on the signal strength record data SIS (k) corresponding to the servo sector SS (k). The MPU 60 determines whether the standardized reproduction signal strength corresponding to the servo sector SS (k) is smaller than the HFW threshold HTH or equal to or greater than the HFW threshold.

In the example shown in FIG. 7, if determining that the standardized reproduction signal strength corresponding to the servo sector SS (k) is smaller than the HFW threshold HTH, the MPU 60 stops the write operation in a data sector region DSR (k) corresponding to the servo sector SS (k) of the disk 10, and executes rewrite processing on the data sector region DSR (k) corresponding to the servo sector SS (k).

In the example illustrated in FIG. 7, during the write processing, the MPU 60 reads the target servo reproduction signal strength of the servo sector SS (k) and reads the signal strength record data SIS (k+1). The MPU 60 reads the target servo reproduction signal strength of the servo sector SS (k+1) during the write processing. The MPU 60 standardizes the target servo reproduction signal strength corresponding to the servo sector SS (k+1) to the standardized reproduction signal strength based on the signal strength record data SIS (k+1) corresponding to the servo sector SS (k+1). The MPU 60 determines whether the standardized reproduction signal strength corresponding to the servo sector SS (k+1) is smaller than the HFW threshold HTH or equal to or greater than the HFW threshold.

In the example shown in FIG. 7, if determining that the standardized reproduction signal strength corresponding to the servo sector SS (k+1) is smaller than the HFW threshold HTH, the MPU 60 stops the write operation in a data sector region DSR (k+1) corresponding to the servo sector SS (k+1) of the disk 10, and executes rewrite processing on the data sector region DSR (k+1) corresponding to the servo sector SS (k+1).

As illustrated in FIG. 7, the MPU 60 reads and demodulates the signal strength record data SIS adjacent immediately after in the read/write direction of the servo sector (hereinafter, sometimes referred to as preceding servo sector) SS targeted before being arranged second before the current servo sector SS, and standardizes the current target servo reproduction signal strength of the current servo sector, and thus it is possible to minimize delay in write fault determination.

FIG. 8 is a schematic view illustrating an example of a change in the target servo reproduction signal strength of the target servo reproduction signal of each servo sector SS with respect to each servo sector SS when each servo sector SS written by the head 15 having the normal flying height and the high flying height is read. In FIG. 8, the horizontal axis represents the servo sector SS, and the vertical axis represents the target servo reproduction signal strength. In the vertical axis of FIG. 8, the target servo reproduction signal strength increases toward the tip side of the large arrow, and decreases toward the tip side of the small arrow. FIG. 8 illustrates a change (hereinafter, sometimes referred to as change in target servo reproduction signal strength corresponding to the normal flying height) USL of the target servo reproduction signal strength of each servo sector SS with respect to each servo sector SS in a case where each servo sector SS written by the head 15 having the normal flying height is read, and a change (hereinafter, sometimes referred to as change in target servo reproduction signal strength corresponding to the high flying height) HSL of the target servo reproduction signal strength of each servo sector SS with respect to each servo sector SS in a case where each servo sector SS written by the head 15 having the high flying height is read. FIG. 8 illustrates a threshold (hereinafter, sometimes referred to as reproduction signal strength threshold) STH of the target servo reproduction signal strength. As illustrated in FIG. 8, for example, the waveform of the change USL in the target servo reproduction signal strength corresponding to the normal flying height and the waveform of the change HSL in the target servo reproduction signal strength corresponding to the high flying height are similar to each other. In other words, the waveform of the target servo reproduction signal strength corresponding to the normal flying height and the waveform of the target servo reproduction signal strength corresponding to the high flying height are similar to each other.

In the example illustrated in FIG. 8, the change USL in the target servo reproduction signal strength corresponding to the normal flying height and the change HSL in the target servo reproduction signal strength corresponding to the high flying height have both a part that is larger and a part that is smaller than the reproduction signal strength threshold STH. Therefore, as illustrated in FIG. 8, it is difficult to determine HFW based on one threshold and the target servo reproduction signal strength.

FIG. 9 is a schematic view illustrating an example of a change in each standardized reproduction signal strength corresponding to each servo sector SS with respect to each servo sector SS in a case of reading each servo sector SS written by the head 15 with the normal flying height and the high flying height. In FIG. 9, the horizontal axis represents the servo sector SS, and the vertical axis represents the standardized reproduction signal strength. In the vertical axis of FIG. 9, the standardized reproduction signal strength increases toward the tip side of the large arrow, and decreases toward the tip side of the small arrow. FIG. 9 illustrates a change (hereinafter, sometimes referred to as change in standardized reproduction signal strength corresponding to the normal flying height) NUSL in the standardized reproduction signal strength corresponding to each servo sector SS with respect to each servo sector SS in a case where each servo sector SS written by the head 15 having the normal flying height is read, and a change (hereinafter, sometimes referred to as change in standardized reproduction signal strength corresponding to the high flying height) NHSL in the standardized reproduction signal strength corresponding to each servo sector SS with respect to each servo sector SS in a case where each servo sector SS written by the head 15 having the high flying height is read. FIG. 9 illustrates the HFW threshold HTH.

In the example illustrated in FIG. 9, the change NUSL in the standardized reproduction signal strength corresponding to the normal flying height is larger than the HFW threshold HTH. The change NHSL in the standardized reproduction signal strength corresponding to the high flying height is smaller than the HFW threshold HTH. Therefore, it is possible to determine HFW based on the standardized reproduction signal strength.

The MPU 60 determines whether the standardized reproduction signal strength corresponding to the predetermined servo sector SS is smaller than the HFW threshold or equal to or greater than the HFW threshold. If determining that the standardized reproduction signal strength corresponding to the predetermined servo sector SS is smaller than the HFW threshold, the MPU 60 determines that HFW occurs. If determining that the standardized reproduction signal strength corresponding to the predetermined servo sector SS is equal to or greater than the HFW threshold, the MPU 60 determines that HFW does not occur.

FIG. 10 is a schematic view illustrating an example of a change in the bit error rate (BER) with respect to the bit per inch (BPI). In FIG. 10, the horizontal axis represents the bit per inch (BPI), and the vertical axis represents the bit error rate (BER). In the horizontal axis of FIG. 10, the BPI increases toward the tip side of the arrow and decreases toward the side opposite to the tip side of the arrow. The horizontal axis in FIG. 10 indicates BPI BP1 and BP2. The BPI BP2 is larger than the BPI BP1. In the vertical axis of FIG. 10, the BER increases toward the tip side of the arrow and decreases toward the side opposite to the tip side of the arrow. In FIG. 10, the vertical axis represents BER BE1, BE2, and BEs. The BER BE2 is larger than the BER BE1. The BER BEs is larger than the BER BE2. The BER BEs corresponds to the BER of the standard of the magnetic disk device 1 set so as not to generate an unrecoverable error that is an error of being incapable of reading, for example. FIG. 10 illustrates a change (hereinafter, sometimes referred to as change in BER corresponding to the normal flying height) BRLU in the BER with respect to the BPI in a case of reading a predetermined region where data is written by the head 15 having the normal flying height, and a change (hereinafter, sometimes referred to as change in BER corresponding to the high flying height) BRLH in the BER with respect to the BPI in a case of reading a predetermined region where data is written by the head 15 having the high flying height.

In the example illustrated in FIG. 10, in a case of not applying the HFW detection method according to the present embodiment, in consideration of a case where the HFW occurs, it is necessary to set the BPI to BPI BP1 so as to become BER BE1 with a certain margin with respect to BER BRs.

In the example illustrated in FIG. 10, in a case of applying the HFW detection method according to the present embodiment, it is less necessary to consider a case where the HFW occurs, and therefore, it becomes possible to set the BPI to BPI BP2 such that the BER becomes BE2, for example. That is, it is possible to improve the BPI by applying the HFW detection method according to the present embodiment.

FIG. 11 is a schematic view illustrating an example of a change in area density capability (ADC) with respect to the BPI. In FIG. 11, the horizontal axis represents the BPI, and the vertical axis represents the area density capability (ADC). The ADC corresponds to a product (BPI×TPI) of the BPI and a track per inch (TPI). In the horizontal axis of FIG. 11, the BPI increases toward the tip side of the arrow, and decreases toward the side opposite to the tip side of the arrow. The horizontal axis in FIG. 11 indicates BPI BP1 and BP2. In the vertical axis of FIG. 11, the ADC increases toward the tip side of the arrow, and decreases toward the side opposite to the tip side of the arrow. In FIG. 11, the vertical axis represents ADC AD1 and AD2. The ADC AD2 is larger than the ADC AD1. FIG. 11 illustrates a change (hereinafter, sometimes referred to as change in ADC) ADL of the ADC with respect to the BPI in the magnetic disk device 1.

In the example illustrated in FIG. 11, in a case where the BPI is BP1, the ADC becomes AD1. There is a predetermined interval between the value at which the ADC is maximized and the ADC AD1. That is, loss occurs in the ADC in the magnetic disk device 1. When the BPI is set to BP2, the ADC becomes AD2. When the ADC becomes AD2, the loss of the ADC in the magnetic disk device 1 is reduced.

FIG. 12 is a flowchart illustrating an example of the HFW detection method according to the present embodiment.

During the write processing, the MPU 60 reads the signal strength record data SIS corresponding to the predetermined servo sector SS (B1201), and reads the target servo reproduction signal strength of this servo sector SS (B1202). Based on this signal strength record data SIS, the MPU 60 standardizes this target servo reproduction signal strength to the standardized reproduction signal strength (B1203). For example, the MPU 60 subtracts or divides this signal strength record data SIS from the target servo reproduction signal strength corresponding to the predetermined servo sector SS to calculate the standardized reproduction signal strength. The MPU 60 determines whether the standardized reproduction signal strength corresponding to the predetermined servo sector SS is smaller than the HFW threshold or equal to or greater than the HFW threshold (B1204). If determining that the standardized reproduction signal strength corresponding to the predetermined servo sector SS is equal to or greater than the HFW threshold (NO in B1204), the MPU 60 determines that HFW does not occur in the predetermined region, and ends the processing. If determining that the standardized reproduction signal strength corresponding to the predetermined servo sector SS is smaller than the HFW threshold (YES in B1204), the MPU 60 determines that HFW occurs in a predetermined region, stops the write processing in this region (B1205), and ends the processing. For example, if determining that the standardized reproduction signal strength corresponding to the predetermined servo sector SS is smaller than the HFW threshold, the MPU 60 determines that HFW occurs in the predetermined region, stops the write processing in the predetermined region, executes the rewrite processing on this predetermined region, or executes saving processing on this predetermined region, and ends the processing.

According to the present embodiment, during the write processing, the magnetic disk device 1 reads the signal strength record data SIS corresponding to the predetermined servo sector SS, and reads the target servo reproduction signal strength of this servo sector SS. Based on this signal strength record data SIS, the magnetic disk device 1 standardizes this target servo reproduction signal strength to the standardized reproduction signal strength. The magnetic disk device 1 determines whether this standardized reproduction signal strength is smaller than the HFW threshold HTH or equal to or greater than the HFW threshold. If determining that this standardized reproduction signal strength is smaller than the HFW threshold HTH, the MPU 60 determines that HFW occurs in the predetermined region, stops the write processing in the predetermined region, and executes the rewrite processing on the predetermined region or executes the saving processing on the predetermined region. Therefore, the magnetic disk device 1 can improve the BPI. The magnetic disk device 1 can improve reliability.

Next, a magnetic disk device according to another embodiment and modifications will be described. In the other embodiment and modifications, the identical parts as those of the first embodiment described above are given the identical reference numerals, and the detailed description thereof will be omitted.

(Modification 1)

A magnetic disk device 1 according to Modification 1 is different in the HFW detection method from the magnetic disk device 1 according to the above-described embodiment.

For example, during the write processing, the MPU 60 averages the predetermined target servo reproduction signal strength corresponding to the predetermined servo sector SS and the target servo reproduction signal strength (hereinafter, sometimes referred to as other target servo reproduction signal strength) corresponding to the other servo sector SS different from this servo sector SS to calculate the target servo reproduction signal strength (hereinafter, sometimes referred to as averaged servo reproduction signal strength) corresponding to the predetermined servo sector SS. During the write processing, the MPU 60 averages the predetermined signal strength record data SIS corresponding to the predetermined servo sector SS and the signal strength record data (hereinafter, sometimes referred to as other signal strength record data) SIS corresponding to the other servo sector SS to calculate the signal strength record data (hereinafter, sometimes referred to as averaged signal strength record data) SIS corresponding to the predetermined servo sector SS. During the write processing, based on the averaged signal strength record data SIS corresponding to the predetermined servo sector SS and the other servo sector SS, the MPU 60 standardizes the averaged servo reproduction signal strength corresponding to this predetermined servo sector SS and the other servo sector SS. For example, during the write processing, the MPU 60 standardizes this averaged servo reproduction signal strength by dividing or subtracting the averaged signal strength record data SIS corresponding to this predetermined servo sector SS and the other servo sector SS from the averaged servo reproduction signal strength corresponding to the predetermined servo sector SS and the other servo sector SS. In other words, during the write processing, the MPU 60 divides or subtracts the averaged signal strength record data SIS corresponding to this predetermined servo sector SS and the other servo sector SS from the averaged servo reproduction signal strength corresponding to the predetermined servo sector SS and the other servo sector SS to calculate the standardized reproduction signal strength (hereinafter, sometimes referred to as averaged standardized reproduction signal strength) corresponding to this predetermined servo sector SS and this other servo sector SS.

In a case where the magnetic disk device 1 is a TDMR type magnetic disk device, during the write processing, the MPU 60 may calculate the averaged servo reproduction signal strength corresponding to the predetermined servo sector SS by averaging a plurality of target servo reproduction signal strengths corresponding to the predetermined servo sector SS read by the plurality of read heads 15R mounted on one head 15. In this case, during the write processing, the MPU 60 may calculate the averaged signal strength record data SIS corresponding to the predetermined servo sector SS by averaging the plurality of signal strength record data SIS corresponding to the predetermined servo sector SS read by the plurality of read heads 15R mounted on one head 15.

For example, during the write processing, the MPU 60 averages the current target servo reproduction signal strength corresponding to the current servo sector SS and the target servo reproduction signal strength (hereinafter, sometimes referred to as preceding target servo reproduction signal strength) corresponding to the preceding servo sector SS arranged second before the current servo sector SS to calculate the target servo reproduction signal strength (hereinafter, sometimes referred to as current averaged servo reproduction signal strength) corresponding to the current servo sector SS and the preceding servo sector SS. During the write processing, the MPU 60 averages the current signal strength record data SIS corresponding to the current servo sector SS and the signal strength record data (hereinafter, sometimes referred to as preceding signal strength record data) SIS corresponding to the preceding servo sector SS to calculate the signal strength record data (hereinafter, sometimes referred to as current averaged signal strength record data) SIS corresponding to the current servo sector SS and the preceding servo sector SS. During the write processing, based on the current averaged signal strength record data SIS corresponding to the current servo sector SS and the preceding servo sector SS, the MPU 60 standardizes the current averaged servo reproduction signal strength corresponding to this current servo sector SS and this preceding servo sector SS. For example, during the write processing, the MPU 60 standardizes this current averaged servo reproduction signal strength by dividing or subtracting the current averaged signal strength record data SIS from the current averaged servo reproduction signal strength. In other words, during the write processing, the MPU 60 calculates the current standardized reproduction signal strength corresponding to the current servo sector SS and the preceding servo sector SS by dividing or subtracting the current averaged signal strength record data SIS from the current averaged servo reproduction signal strength.

For example, if determining that HFW occurs in the predetermined region of the disk 10 based on the averaged standardized reproduction signal strength corresponding to the predetermined servo sector SS and the other servo sectors SS, the MPU 60 stops the write operation in the predetermined region of the disk 10, and executes the rewrite processing from the data sector region (hereinafter, sometimes referred to as other data sector region) DSR corresponding to the other servo sector SS of the disk 10 to the data sector region DSR corresponding to the predetermined servo sector SS. For example, if determining that HFW occurs in another data sector region corresponding to the other servo sector SS of the disk 10 and a predetermined data sector region corresponding to the predetermined servo sector SS based on the averaged signal strength record data corresponding to the predetermined servo sector SS and the other servo sector SS, the MPU 60 stops the write operation in the other data sector region corresponding to the other servo sector SS of the disk 10 and the predetermined data sector region corresponding to the predetermined servo sector SS, and executes the rewrite processing from this other data sector region to this predetermined data sector region.

For example, if determining that HFW occurs in the predetermined region of the disk 10 based on the averaged standardized reproduction signal strength corresponding to the predetermined servo sector SS and the other servo sectors SS, the MPU 60 stops the write operation in the predetermined region of the disk 10, and executes the saving processing of the data in the region from the data sector region (hereinafter, sometimes referred to as other data sector region) DSR corresponding to the other servo sector SS of the disk 10 to the data sector region DSR corresponding to the predetermined servo sector SS to another alternative region, for example, the disk 10, the volatile memory 70, the nonvolatile memory 80, or the buffer memory 90. For example, if determining that HFW occurs in another data sector region corresponding to the other servo sector SS of the disk 10 and a predetermined data sector region corresponding to the predetermined servo sector SS based on the averaged signal strength record data corresponding to the predetermined servo sector SS and the other servo sector SS, the MPU 60 stops the write operation in the other data sector region corresponding to the other servo sector SS of the disk 10 and the predetermined data sector region corresponding to the predetermined servo sector SS, and executes the saving processing on data in the region from this other data sector region to this predetermined data sector region to another alternative region, for example, the disk 10, the volatile memory 70, the nonvolatile memory 80, or the buffer memory 90.

Figure 13:
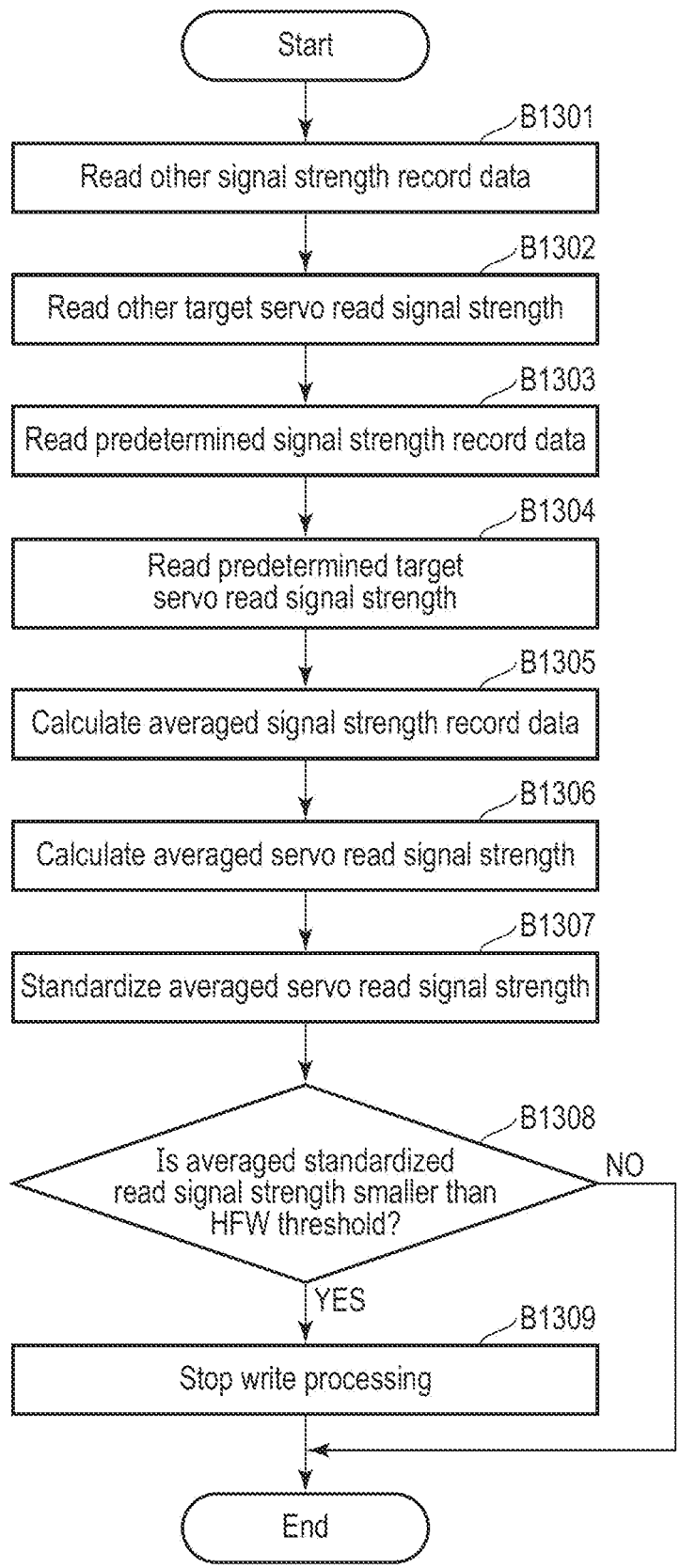
FIG. 13 is a flowchart illustrating an example of an HFW detection method according to Modification 1.

FIG. 13 is a flowchart illustrating an example of the HFW detection method according to Modification 1.

During the write processing, the MPU 60 reads the other signal strength record data SIS corresponding to the other servo sector SS different from the predetermined servo sector (B1301), and reads the other target servo reproduction signal strength corresponding to the other servo sector SS (B1302). The MPU 60 reads the predetermined signal strength record data SIS corresponding to the predetermined servo sector SS (B1303), and reads the predetermined target servo reproduction signal strength corresponding to the predetermined servo sector SS (B1304). The MPU 60 averages the predetermined signal strength record data SIS and the other signal strength record data SIS to calculate the averaged signal strength record data SIS (B1305). The MPU 60 averages the predetermined target servo reproduction signal strength and the other target servo reproduction signal strength to calculate the averaged servo reproduction signal strength (B1306). Based on this averaged signal strength record data SIS, the MPU 60 standardizes this averaged servo reproduction signal strength to the averaged standardized reproduction signal strength (B1307). The MPU 60 determines whether the averaged standardized reproduction signal strength corresponding to the predetermined servo sector SS and the other servo sector SS is smaller than the HFW threshold or equal to or greater than the HFW threshold (B1308). If determining that the averaged standardized reproduction signal strength corresponding to the predetermined servo sector SS and the other servo sectors SS is equal to or greater than the HFW threshold (NO in B1308), the MPU 60 determines that HFW does not occur in the predetermined region, and ends the processing. If determining that the averaged standardized reproduction signal strength corresponding to the predetermined servo sector SS and the other servo sector SS is smaller than the HFW threshold (YES in B1308), the MPU 60 determines that HFW occurs in a predetermined region, stops the write processing in this region (B1309), and ends the processing.

According to Modification 1, during the write processing, the magnetic disk device 1 averages the predetermined target servo reproduction signal strength and the other target servo reproduction signal strength to calculate the averaged servo reproduction signal strength. Based on this averaged signal strength record data SIS, the magnetic disk device 1 standardizes this averaged servo reproduction signal strength to the standardized reproduction signal strength. The magnetic disk device 1 determines whether the averaged standardized reproduction signal strength corresponding to the predetermined servo sector SS and the other servo sectors SS is smaller than the HFW threshold or equal to or greater than the HFW threshold HTH. If determining that this averaged standardized reproduction signal strength is smaller than the HFW threshold HTH, the magnetic disk device 1 determines that HFW occurs in the predetermined data sector region DSR corresponding to the predetermined servo sector SS and the other data sector region DSR corresponding to the other servo sector SS, stops the write processing in the predetermined data sector region DSR corresponding to the servo sector SS and the other data sector region DSR corresponding to the other servo sector SS, and executes the rewrite processing on the predetermined data sector region DSR corresponding to the servo sector SS and the other data sector region DSR corresponding to the other servo sector SS, or executes the saving processing on the predetermined data sector region DSR corresponding to the servo sector SS and the other data sector region DSR corresponding to the other servo sector SS. Therefore, the magnetic disk device 1 can improve the BPI. The magnetic disk device 1 can improve reliability.

(Modification 2)

A magnetic disk device 1 according to Modification 2 is different in the HFW detection method from the magnetic disk device 1 according to the above-described embodiment.

For example, during the write processing, the MPU 60 standardizes the predetermined target servo reproduction signal strength corresponding to the predetermined servo sector SS to a predetermined signal strength (hereinafter, sometimes referred to as target standardized signal strength) based on the predetermined signal strength record data SIS corresponding to the predetermined servo sector SS. During the write processing, based on the other signal strength record data SIS corresponding to the other servo sector SS, the MPU 60 standardizes the other target servo reproduction signal strength corresponding to the other servo sector SS to a predetermined signal strength (hereinafter, sometimes referred to as other standardized signal strength). The MPU 60 averages the predetermined target standardized signal strength corresponding to the predetermined servo sector SS and the other standardized signal strength corresponding to the other servo sector SS to calculate the averaged standardized signal strength corresponding to the predetermined servo sector SS.

If determining that the averaged standardized signal strength corresponding to the predetermined servo sector SS is smaller than the HFW threshold (or equal to or less than the HFW threshold), the HFW detection section 630 determines that HFW occurs in the predetermined region of the disk 10. If determining that the averaged standardized signal strength corresponding to the predetermined servo sector SS is equal to or greater than the HFW threshold (or larger than the HFW threshold), the HFW detection section 630 determines that HFW occurs in the predetermined region of the disk 10.

Figure 14:
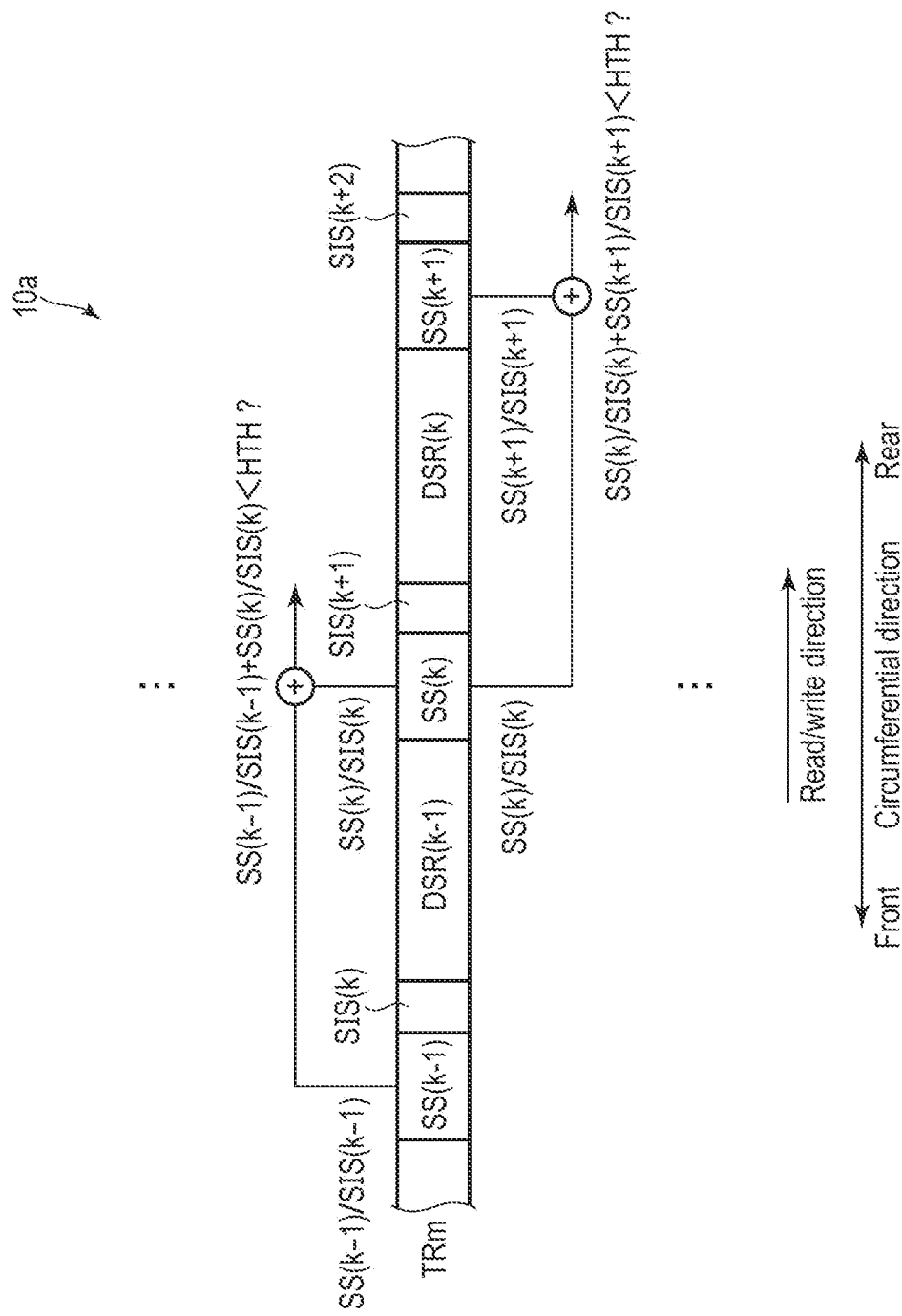
FIG. 14 is a schematic view illustrating an example of an HFW detection method according to Modification 2.

FIG. 14 is a schematic view illustrating an example of the HFW detection method according to Modification 2. The track TRm illustrated in FIG. 14 corresponds to the track TRm illustrated in FIG. 6.

In the example illustrated in FIG. 14, during the write processing, the MPU 60 reads the signal strength record data SIS (k−1) corresponding to the servo sector SS (k−1). The MPU 60 reads the target servo reproduction signal strength of the servo sector SS (k−1) during the write processing. The MPU 60 standardizes the target servo reproduction signal strength corresponding to the servo sector SS (k−1) to the standardized reproduction signal strength based on the signal strength record data SIS (k−1) corresponding to the servo sector SS (k−1). The MPU 60 reads the signal strength record data SIS (k) corresponding to the servo sector SS (k) during the write processing. The MPU 60 reads the target servo reproduction signal strength of the servo sector SS (k) during the write processing. The MPU 60 standardizes the target servo reproduction signal strength corresponding to the servo sector SS (k) to the standardized reproduction signal strength based on the signal strength record data SIS (k) corresponding to the servo sector SS (k). The MPU 60 averages the standardized reproduction signal strength corresponding to the servo sector SS (k−1) and the standardized reproduction signal strength corresponding to the servo sector SS (k) to calculate the averaged standardized signal strength corresponding to the predetermined servo sector SS. The MPU 60 determines whether the averaged standardized reproduction signal strength corresponding to the servo sectors SS (k−1) and SS (k) is smaller than the HFW threshold HTH or equal to or greater than the HFW threshold.

In the example illustrated in FIG. 14, if determining that the averaged standardized reproduction signal strength corresponding to the servo sectors SS (k−1) and SS (k) is smaller than the HFW threshold HTH, the MPU 60 stops the write operation in the data sector region DSR (k−1) corresponding to the servo sector SS (k−1) of the disk 10 and the data sector region DSR (k) corresponding to the servo sector SS (k), and executes the rewrite processing from this data sector region DSR (k−1) to this data sector region DSR (k).

In the example illustrated in FIG. 14, during the write processing, the MPU 60 reads the signal strength record data SIS (k) corresponding to the servo sector SS (k). The MPU 60 reads the target servo reproduction signal strength of the servo sector SS (k) during the write processing. The MPU 60 standardizes the target servo reproduction signal strength corresponding to the servo sector SS (k) to the standardized reproduction signal strength based on the signal strength record data SIS (k) corresponding to the servo sector SS (k). The MPU 60 reads the signal strength record data SIS (k+1) corresponding to the servo sector SS (k+1) during the write processing. The MPU 60 reads the target servo reproduction signal strength of the servo sector SS (k+1) during the write processing. The MPU 60 standardizes the target servo reproduction signal strength corresponding to the servo sector SS (k+1) to the standardized reproduction signal strength based on the signal strength record data SIS (k+1) corresponding to the servo sector SS (k+1). The MPU 60 averages the standardized reproduction signal strength corresponding to the servo sector SS (k) and the standardized reproduction signal strength corresponding to the servo sector SS (k+1) to calculate the averaged standardized signal strength corresponding to the predetermined servo sector SS. The MPU 60 determines whether the averaged standardized reproduction signal strength corresponding to the servo sectors SS (k) and SS (k+1) is smaller than the HFW threshold HTH or equal to or greater than the HFW threshold.

In the example illustrated in FIG. 14, if determining that the averaged standardized reproduction signal strength corresponding to the servo sectors SS (k) and SS (k+1) is smaller than the HFW threshold HTH, the MPU 60 stops the write operation in the data sector region DSR (k) corresponding to the servo sector SS (k) of the disk 10 and the data sector region DSR (k+1) corresponding to the servo sector SS (k+1), and executes the rewrite processing from this data sector region DSR (k) to this data sector region DSR (k+1).

Figure 15:
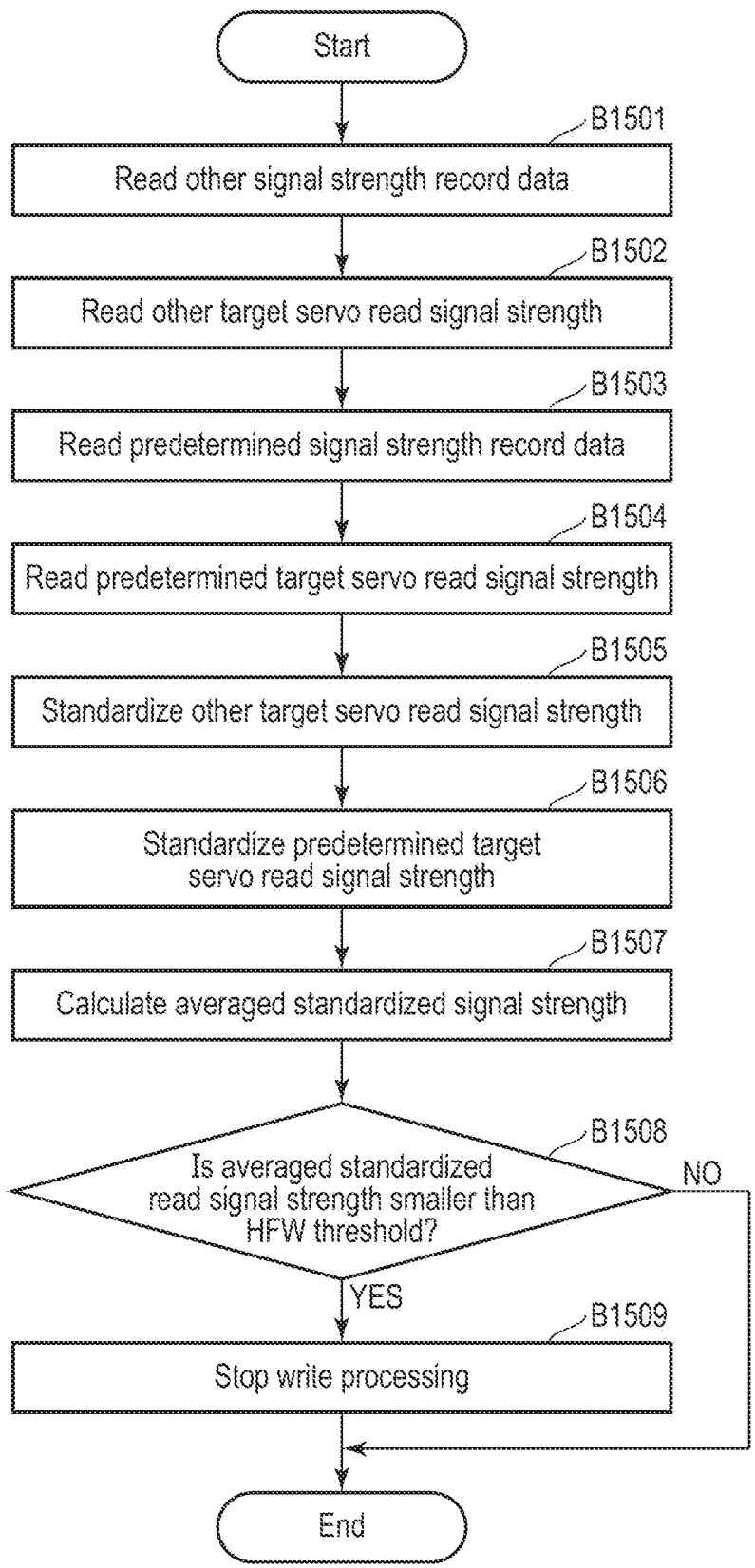
FIG. 15 is a flowchart illustrating an example of the HFW detection method according to Modification 2.

FIG. 15 is a flowchart illustrating an example of the HFW detection method according to Modification 2.

During the write processing, the MPU 60 reads the other signal strength record data SIS corresponding to the other servo sector SS different from the predetermined servo sector (B1501), and reads the other target servo reproduction signal strength corresponding to the other servo sector SS (B1502). The MPU 60 reads the predetermined signal strength record data SIS corresponding to the predetermined servo sector SS (B1503), and reads the predetermined target servo reproduction signal strength corresponding to the predetermined servo sector SS (B1504). The MPU 60 standardizes the other target servo reproduction signal strength to the other standardized signal strength based on the other signal strength record data SIS (B1505). The MPU 60 standardizes the target servo reproduction signal strength to the target standardized signal strength based on the predetermined signal strength record data SIS (B1506). The MPU 60 averages the other standardized signal strengths and the target standardized signal strength to calculate an averaged standardized signal strength corresponding to a predetermined servo sector SS (B1507).

The MPU 60 determines whether the averaged standardized signal strength corresponding to the predetermined servo sector SS is smaller than the HFW threshold or equal to or greater than the HFW threshold (B1508). If determining that the averaged standardized signal strength corresponding to the predetermined servo sector SS is equal to or greater than the HFW threshold (NO in B1508), the MPU 60 determines that HFW does not occur in the predetermined region, and ends the processing. If determining that the averaged standardized signal strength corresponding to the predetermined servo sector SS is smaller than the HFW threshold (YES in B1508), the MPU 60 determines that HFW occurs in the predetermined region, stops the write processing in this region (B1509), and ends the processing.

According to Modification 2, during the write processing, the magnetic disk device 1 averages the other standardized signal strength and the target standardized signal strength to calculate the averaged standardized signal strength corresponding to the predetermined servo sector SS and the other servo sector SS. The magnetic disk device 1 determines whether the averaged standardized signal strength corresponding to the predetermined servo sector SS and the other servo sectors SS is smaller than the HFW threshold HTH or equal to or greater than the HFW threshold HTH. If determining that this averaged standardized signal strength is smaller than the HFW threshold HTH, the magnetic disk device 1 determines that HFW occurs in the predetermined data sector region DSR corresponding to the predetermined servo sector SS and the other data sector region DSR corresponding to the other servo sector SS, stops the write processing in the predetermined data sector region DSR corresponding to the servo sector SS and the other data sector region DSR corresponding to the other servo sector SS, and executes the rewrite processing on the predetermined data sector region DSR corresponding to the servo sector SS and the other data sector region DSR corresponding to the other servo sector SS, or executes the saving processing on the predetermined data sector region DSR corresponding to the servo sector SS and the other data sector region DSR corresponding to the other servo sector SS. Therefore, the magnetic disk device 1 can improve the BPI. The magnetic disk device 1 can improve reliability.

(Modification 3)

A magnetic disk device 1 according to Modification 3 is different in the HFW detection method from the magnetic disk device 1 according to the above-described embodiment.

In a predetermined track, the MPU 60 continuously writes, immediately after in the read/write direction of the predetermined servo sector SS or the other servo sector SS, the signal strength record data (hereinafter, sometimes referred to as averaged signal strength record data) ASIS corresponding to the predetermined servo sector SS calculated by averaging the predetermined signal strength record data SIS corresponding to the predetermined servo sector SS and the other signal strength record data SIS corresponding to the other servo sector SS. The MPU 60 may continuously write the averaged signal strength record data ASIS corresponding to the predetermined servo sector SS and the other servo sectors SS immediately after in the read/write direction of this servo sector SS, or may continuously write the same immediately after in the read/write direction of a servo sector other than this servo sector SS. The MPU 60 may write the averaged signal strength record data ASIS corresponding to the predetermined servo sector SS and the other servo sectors SS into a region other than the signal strength record region immediately after in the read/write direction of this servo sector SS, or may write the same into a region other than the signal strength record region immediately after in the read/write direction of the servo sectors SS other than this servo sector SS. Thus, by averaging the plurality of, for example two signal strength record data SIS corresponding to each of the plurality of, for example two servo sectors, the servo region that is the target of Fourier transform can be regarded as several times, for example, twice.

For example, in a predetermined track, the MPU 60 continuously writes, immediately after in the read/write direction of the current servo sector SS, the averaged signal strength record data (hereinafter, sometimes referred to as next averaged signal strength record data) SIS corresponding to the current servo sector SS and the next servo sector SS calculated by averaging the current signal strength record data SIS corresponding to the current servo sector SS and the next signal strength record data SIS corresponding to the next servo sector SS.

For example, the MPU 60 may continuously write, immediately after in the read/write direction of the current servo sector SS, the averaged signal strength record data (hereinafter, sometimes referred to as current averaged signal strength record data) SIS corresponding to the preceding servo sector SS and the current servo sector SS calculated by averaging the preceding signal strength record data SIS corresponding to the preceding servo sector SS and the current signal strength record data SIS corresponding to the current servo sector SS.

The MPU 60 may continuously write the current averaged signal strength record data SIS corresponding to the preceding servo sector SS and the current servo sector SS immediately after in the read/write direction of this current servo sector SS, or may continuously write the same immediately after in the read/write direction of the servo sector SS other than this current servo sector SS. The MPU 60 may write the current averaged signal strength record data SIS corresponding to the preceding servo sector SS and the current servo sector SS into a region other than the signal strength record region immediately after in the read/write direction of this current servo sector SS, or may write the same into a region other than the signal strength record region immediately after in the read/write direction of the servo sector SS other than this current servo sector SS.

During the write processing of the predetermined track, the MPU 60 standardizes the sum of the target servo reproduction signal strength corresponding to this servo sector SS that has just been read and the other target servo reproduction signal strength corresponding to the other servo sector SS based on the averaged signal strength record data SIS corresponding to this servo sector SS that has been written by reading in advance the target region of this servo sector SS and the other servo sector SS. For example, during the write processing of the predetermined track, the MPU 60 standardizes the sum of the predetermined target servo reproduction signal strength corresponding to the predetermined servo sector SS and the other target servo reproduction signal strength corresponding to the other servo sector SS by dividing or subtracting the averaged signal strength record data SIS corresponding to this predetermined servo sector SS and this other servo sector SS from the sum of the predetermined target servo reproduction signal strength corresponding to the predetermined servo sector SS and the other target servo reproduction signal strength corresponding to the other servo sector SS. In other words, the MPU 60 calculates the averaged standardized reproduction signal strength corresponding to this predetermined servo sector SS and this other servo sector SS by dividing or subtracting the averaged signal strength record data SIS corresponding to this predetermined servo sector SS and this other servo sector SS from the sum of the predetermined target servo reproduction signal strength corresponding to the predetermined servo sector SS and the other target servo reproduction signal strength corresponding to the other servo sector SS.

For example, when reading the preceding servo sector SS and the current servo sector SS during the write processing of the predetermined track, the MPU 60 standardizes the sum of the preceding target servo reproduction signal strength corresponding to the preceding servo sector SS and the current target servo reproduction signal strength corresponding to the current servo sector SS based on the current averaged signal strength record data SIS. For example, during the write processing of the predetermined track, the MPU 60 standardizes the sum of the preceding target servo reproduction signal strength corresponding to the preceding servo sector SS and the current target servo reproduction signal strength corresponding to the current servo sector SS by dividing or subtracting the current averaged signal strength record data SIS from the sum of the preceding target servo reproduction signal strength corresponding to the preceding servo sector SS and the current target servo reproduction signal strength corresponding to the current servo sector SS. In other words, during the write processing of the predetermined track, the MPU 60 calculates the averaged standardized reproduction signal strength (hereinafter, sometimes referred to as current averaged standardized reproduction signal strength) corresponding to the current servo sector SS by dividing or subtracting the current averaged signal strength record data SIS from the sum of the preceding target servo reproduction signal strength corresponding to the preceding servo sector SS and the current target servo reproduction signal strength corresponding to the current servo sector SS.

In a case where the magnetic disk device 1 is a TDMR type magnetic disk device, the MPU 60 may calculate the averaged signal strength record data SIS corresponding to the predetermined servo sector SS by averaging a plurality of signal strength record data SIS corresponding to the predetermined servo sector SS read by the plurality of read heads 15R mounted on one head 15. Based on this averaged signal strength record data SIS, the MPU 60 may standardize the target servo reproduction signal strength corresponding to this servo sector SS that has just been read.

For example, if determining that HFW occurs in the predetermined region of the disk 10 based on the averaged standardized reproduction signal strength corresponding to the predetermined servo sector SS and the other servo sector SS, the MPU 60 stops the write operation in the predetermined region of the disk 10, and executes the rewrite processing from the other data sector region DSR corresponding to the other servo sector SS of the disk 10 to the data sector region DSR corresponding to the predetermined servo sector SS. For example, if determining that HFW occurs in another data sector region corresponding to the other servo sector SS of the disk 10 and a predetermined data sector region corresponding to the predetermined servo sector SS based on the averaged signal strength record data corresponding to the predetermined servo sector SS and the other servo sector SS, the MPU 60 stops the write operation in the other data sector region corresponding to the other servo sector SS of the disk 10 and the predetermined data sector region corresponding to the predetermined servo sector SS, and executes the rewrite processing from this other data sector region to this predetermined data sector region.

For example, if determining that HFW occurs in the predetermined region of the disk 10 based on the averaged standardized reproduction signal strength corresponding to the predetermined servo sector SS and the other servo sectors SS, the MPU 60 stops the write operation in the predetermined region of the disk 10, and executes the saving processing of the data in the region from the data sector region (hereinafter, sometimes referred to as other data sector region) DSR corresponding to the other servo sector SS of the disk 10 to the data sector region DSR corresponding to the predetermined servo sector SS to another alternative region, for example, the disk 10, the volatile memory 70, the nonvolatile memory 80, or the buffer memory 90. For example, if determining that HFW occurs in another data sector region corresponding to the other servo sector SS of the disk 10 and a predetermined data sector region corresponding to the predetermined servo sector SS based on the averaged signal strength record data corresponding to the predetermined servo sector SS and the other servo sector SS, the MPU 60 stops the write operation in the other data sector region corresponding to the other servo sector SS of the disk 10 and the predetermined data sector region corresponding to the predetermined servo sector SS, and executes the saving processing on data in the region from this other data sector region to this predetermined data sector region to another alternative region, for example, the disk 10, the volatile memory 70, the nonvolatile memory 80, or the buffer memory 90.

Figure 16:
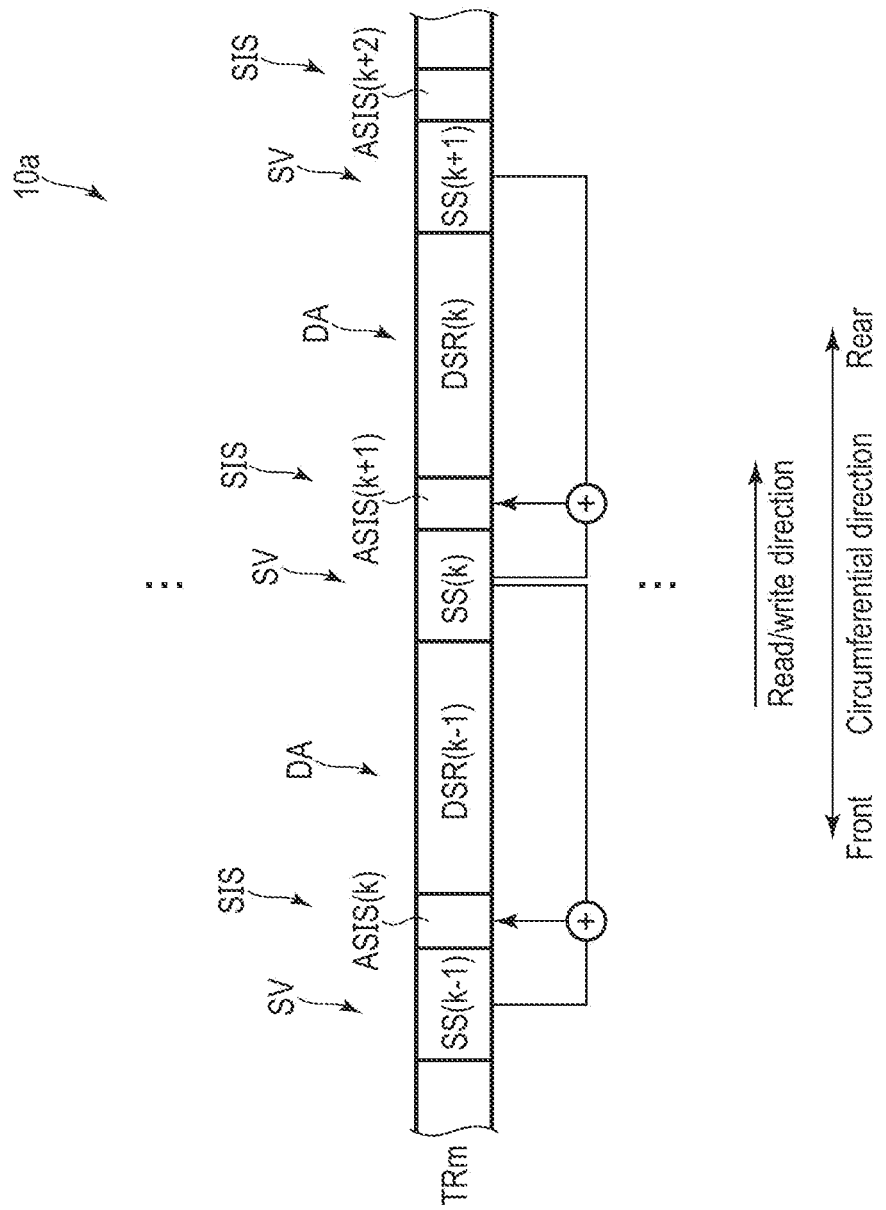
FIG. 16 is a schematic view illustrating an example of arrangement of averaged signal strength record data according to Modification 3.

FIG. 16 is a schematic view illustrating an example of arrangement of the averaged signal strength record data SIS according to Modification 3. FIG. 16 illustrates the track TRm. The track TRm includes the servo sectors SS (k−1), SS (k), and SS (k+1), and averaged signal strength record data ASIS (k), ASIS (k+1), and ASIS (k+2). In FIG. 16, the averaged signal strength record data ASIS (k), ASIS (k+1), and ASIS (k+2) are arranged at intervals in the read/write direction in the described order. In other words, the averaged signal strength record data ASIS (k+1) is arranged at intervals in the read/write direction of the averaged signal strength record data ASIS (k). The averaged signal strength record data ASIS (k+2) is arranged at intervals in the read/write direction of the averaged signal strength record data ASIS (k+1). The averaged signal strength record data ASIS (k) is arranged between the servo sectors SS (k−1) and SS (k), and is adjacent in the read/write direction of the servo sector SS (k−1). The averaged signal strength record data ASIS (k) corresponds to the signal strength record data in which the signal strength record data SIS (k−1) and SIS (k) are averaged. The averaged signal strength record data ASIS (k) corresponds to the servo sector SS (k). The averaged signal strength record data ASIS (k+1) is arranged between the servo sectors SS (k) and SS (k+1), and is adjacent in the read/write direction of the servo sector SS (k). The averaged signal strength record data ASIS (k+1) corresponds to the signal strength record data in which the signal strength record data corresponding to the servo sectors SS (k) and SS (k+1) are averaged. The averaged signal strength record data ASIS (k+1) corresponds to the servo sector SS (k+1). The averaged signal strength record data ASIS (k+2) is adjacent in the read/write direction of the servo sector SS (k+1). The averaged signal strength record data ASIS (k+2) corresponds to the signal strength record data in which the signal strength record data corresponding to the servo sectors SS (k+1) and SS (k+2) are averaged. The averaged signal strength record data ASIS (k+2) corresponds to the servo sector SS (k+2) next to the servo sector SS (k+1) not illustrated.

In the example illustrated in FIG. 16, in the track TRm, the MPU 60 writes the signal strength record data ASIS (k) adjacent in the read/write direction of the servo sector SS (k−1), writes the signal strength record data SIS (k+1) adjacent in the read/write direction of the servo sector SS (k), and writes the signal strength record data ASIS (k+2) adjacent in the read/write direction of the servo sector SS (k+1). In other words, in the track TRm, the MPU 60 writes the signal strength record data ASIS (k) immediately after the servo sector SS (k−1), writes the signal strength record data SIS (k+1) immediately after the servo sector SS (k), and writes the signal strength record data ASIS (k+2) immediately after the servo sector SS (k+1).

Figure 17:
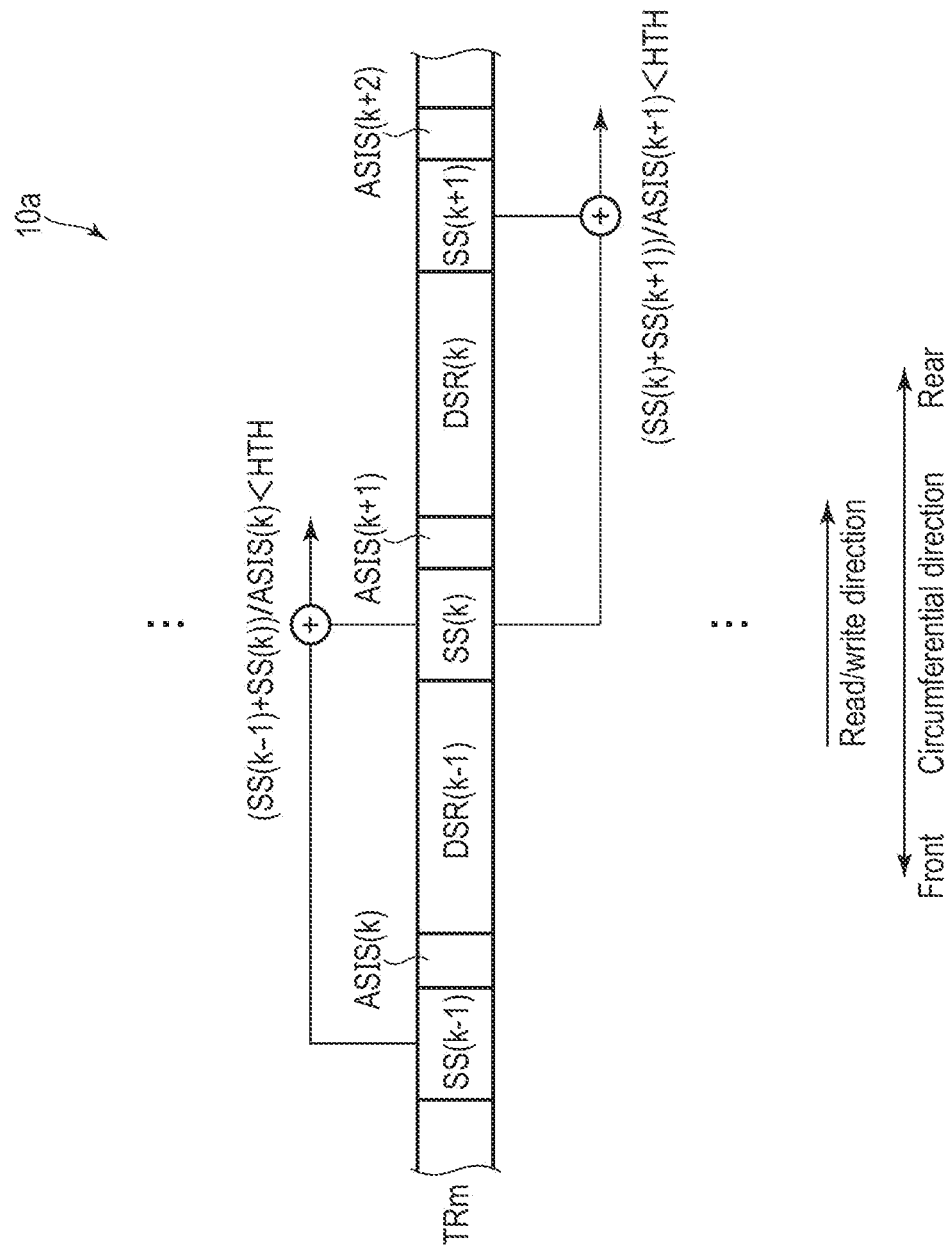
FIG. 17 is a schematic view illustrating an example of an HFW detection method according to Modification 3.

FIG. 17 is a schematic view illustrating an example of the HFW detection method according to Modification 3. The track TRm illustrated in FIG. 17 corresponds to the track TRm illustrated in FIG. 16.

In the example illustrated in FIG. 17, the MPU 60 reads the target servo reproduction signal strength corresponding to the servo sector SS (k−1) during the write processing of the track TRm. The MPU 60 reads the averaged signal strength record data ASIS (k) corresponding to the servo sectors SS (k−1) and SS (k). The MPU 60 reads the target servo reproduction signal strength corresponding to the servo sector SS (k). Based on the averaged signal strength record data ASIS (k) corresponding to the servo sectors SS (k−1) and SS (k), the MPU 60 standardizes, to the averaged standardized reproduction signal strength, the sum of the target servo reproduction signal strength corresponding to the servo sector SS (k−1) and the target servo reproduction signal strength corresponding to the servo sector SS (k). The MPU 60 determines whether the standardized reproduction signal strength corresponding to the servo sectors SS (k−1) and SS (k) is smaller than the HFW threshold HTH or equal to or greater than the HFW threshold HTH.

In the example illustrated in FIG. 17, if determining that the standardized reproduction signal strength corresponding to the servo sectors SS (k−1) and SS (k) is smaller than the HFW threshold HTH, the MPU 60 stops the write operation in the data sector region DSR (k−1) corresponding to the servo sector SS (k−1) and the data sector region DSR (k) corresponding to the servo sector SS (k), and executes the rewrite processing from this data sector DSR (k−1) to this data sector region DSR (k).

In the example illustrated in FIG. 17, the MPU 60 reads the target servo reproduction signal strength corresponding to the servo sector SS (k) during the write processing of the track TRm. The MPU 60 reads the averaged signal strength record data ASIS (k+1) corresponding to the servo sectors SS (k) and SS (k+1). The MPU 60 reads the target servo reproduction signal strength corresponding to the servo sector SS (k+1). Based on the averaged signal strength record data ASIS (k+1) corresponding to the servo sectors SS (k) and SS (k+1), the MPU 60 standardizes, to the averaged standardized reproduction signal strength, the sum of the target servo reproduction signal strength corresponding to the servo sector SS (k) and the target servo reproduction signal strength corresponding to the servo sector SS (k+1). The MPU 60 determines whether the standardized reproduction signal strength corresponding to the servo sectors SS (k) and SS (k+1) is smaller than the HFW threshold HTH or equal to or greater than the HFW threshold HTH.

In the example illustrated in FIG. 17, if determining that the standardized reproduction signal strength corresponding to the servo sectors SS (k) and SS (k+1) is smaller than the HFW threshold HTH, the MPU 60 stops the write operation in the data sector region DSR (k) corresponding to the servo sector SS (k) and the data sector region DSR (k+1) corresponding to the servo sector SS (k+1), and executes the rewrite processing from this data sector DSR (k) to this data sector region DSR (k+1).

Figure 18:
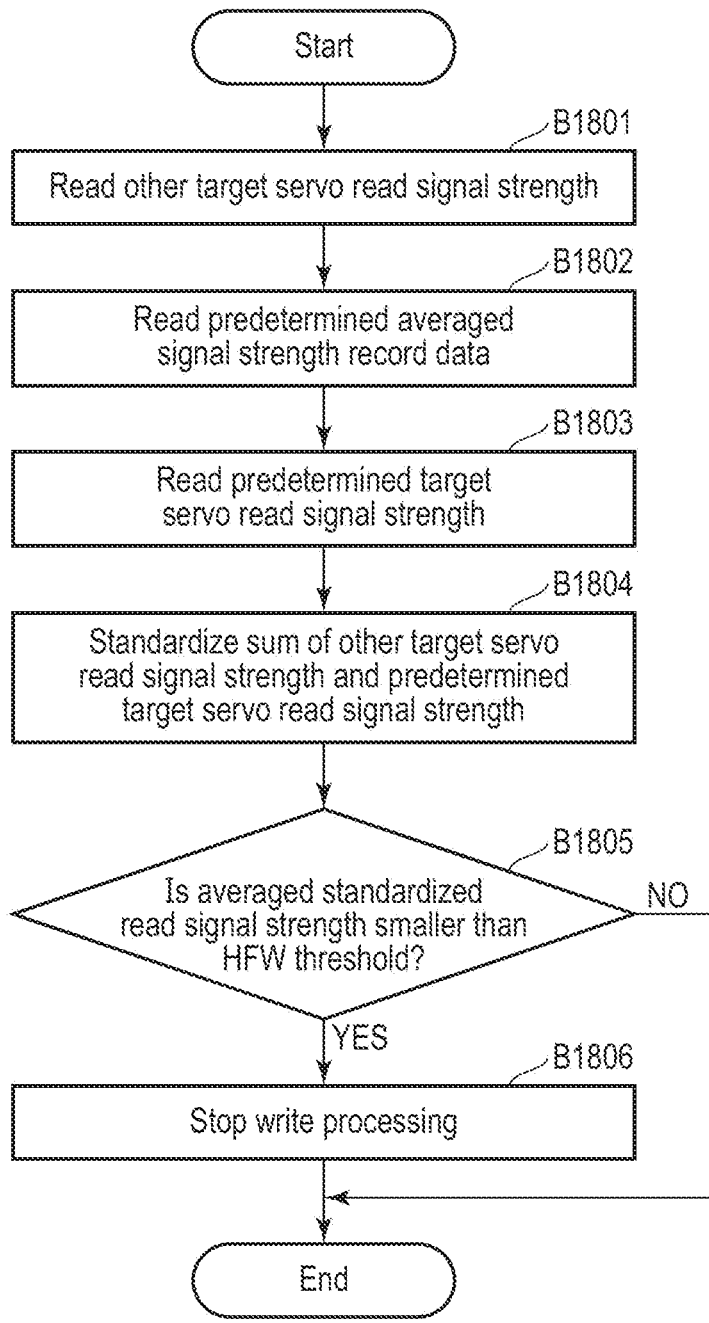
FIG. 18 is a flowchart illustrating an example of the HFW detection method according to Modification 3.

FIG. 18 is a flowchart illustrating an example of the HFW detection method according to Modification 3.

During the write processing, the MPU 60 reads the other target servo reproduction signal strength corresponding to the other servo sector SS (B1801), and reads the predetermined averaged signal strength record data ASIS corresponding to the predetermined servo sector SS (B1802). The MPU 60 reads the target servo reproduction signal strength of this predetermined servo sector SS (B1803). The MPU 60 standardizes the sum of this other target servo reproduction signal strength and this predetermined target servo reproduction signal strength to the averaged standardized reproduction signal strength based on this predetermined averaged signal strength record data ASIS (B1804). The MPU 60 determines whether the averaged standardized reproduction signal strength corresponding to the other servo sectors SS and the predetermined servo sector SS is smaller than the HFW threshold or equal to or greater than the HFW threshold (B1805). If determining that the averaged standardized reproduction signal strength corresponding to the other servo sector SS and the predetermined servo sector SS is equal to or greater than the HFW threshold (NO in B1805), the MPU 60 determines that HFW does not occur in the other servo sector SS and the predetermined servo sector SS, and ends the processing. If determining that the averaged standardized reproduction signal strength corresponding to the other servo sector SS and the predetermined servo sector SS is smaller than the HFW threshold (YES in B1805), the MPU 60 determines that HFW occurs in the other servo sector SS and the predetermined servo sector SS, stops the write processing in the other servo sector SS and the predetermined servo sector SS (B1806), and ends the processing.

According to Modification 3, during the write processing, the magnetic disk device 1 reads the other target servo reproduction signal strength corresponding to the other servo sector SS, reads the predetermined averaged signal strength record data ASIS corresponding to the predetermined servo sector SS, and reads the target servo reproduction signal strength of this predetermined servo sector SS. The magnetic disk device 1 standardizes the sum of this other target servo reproduction signal strength and this predetermined target servo reproduction signal strength to the averaged standardized reproduction signal strength based on this predetermined averaged signal strength record data ASIS. The magnetic disk device 1 determines whether this averaged standardized reproduction signal strength is smaller than the HFW threshold or equal to or greater than the HFW threshold. If determining that this averaged standardized reproduction signal strength is smaller than the HFW threshold, the MPU 60 determines that HFW occurs in the other data sector region corresponding to the other servo sector SS and the predetermined data sector region corresponding to the predetermined servo sector SS, stops the write processing in the other data sector region corresponding to the other servo sector SS and the predetermined data sector region corresponding to the predetermined servo sector SS, and executes the rewrite processing from the other data sector region corresponding to the other servo sector SS to the predetermined data sector region corresponding to the predetermined servo sector SS, or executes the saving processing to the other data sector region corresponding to the other servo sector SS and the predetermined data sector region corresponding to the predetermined servo sector SS. Therefore, the magnetic disk device 1 can improve the BPI. The magnetic disk device 1 can improve reliability.

Second Embodiment

A magnetic disk device 1 according to the second embodiment is different in HFW detection method from the magnetic disk devices 1 of the first embodiment, Modification 1, Modification 2, and Modification 3 described above.

Figure 19:
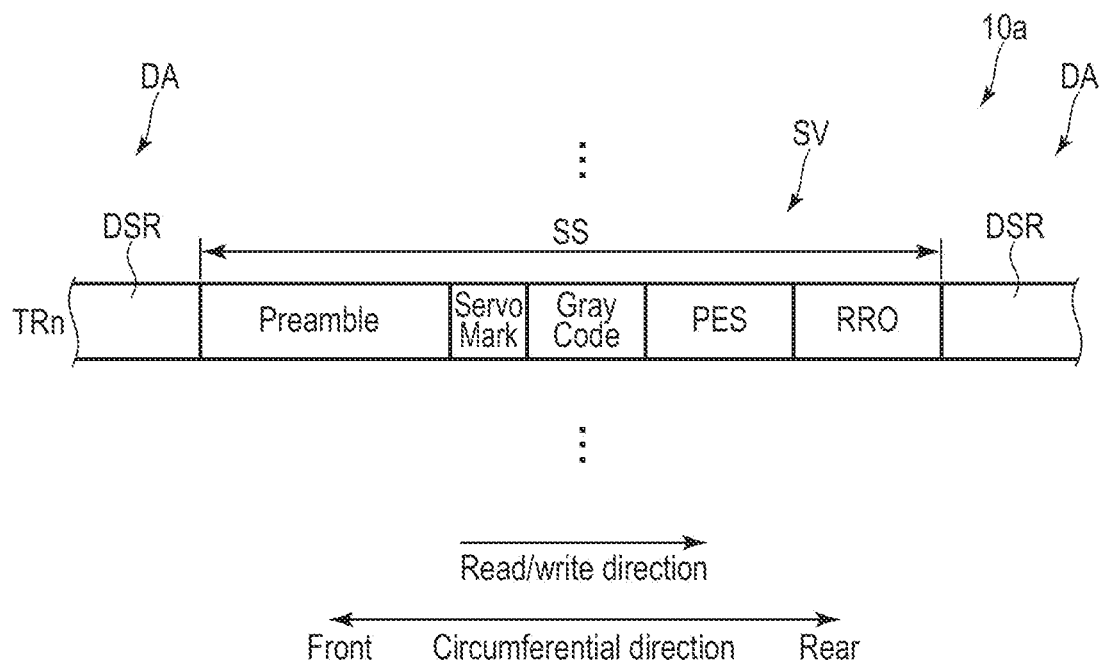
FIG. 19 is a schematic view illustrating an example of a configuration of a servo sector according to a second embodiment.

FIG. 19 is a schematic view illustrating an example of the configuration of a servo sector SS according to the second embodiment. FIG. 19 illustrates a predetermined servo sector SS written in a predetermined track TR of a disk 10.

In the example illustrated in FIG. 19, the data sector region DSR does not include the signal strength record data SIS corresponding to the predetermined servo sector SS in the signal strength record region adjacent to the predetermined servo sector SS. That is, the data sector region DSR does not include the signal strength record region.

The MPU 60 has thresholds (hereinafter, sometimes referred to as reproduction signal strength threshold) of a plurality of target servo reproduction signal strengths corresponding to the plurality of respective servo sectors. For example, the reproduction signal strength threshold corresponds to an intermediate value between the target servo reproduction signal strength (hereinafter, sometimes referred to as target servo reproduction signal strength corresponding to the normal flying height) of this servo sector SS when reading the servo sector SS written by the head 15 having the normal flying height and the target servo reproduction signal strength (hereinafter, sometimes referred to as target servo reproduction signal strength corresponding to the high flying height) of this servo sector SS when reading the servo sector SS written by the head 15 having the high flying height. The reproduction signal strength threshold may correspond to an average value of a plurality of intermediate values between a plurality of target servo reproduction signal strengths corresponding to the normal flying heights corresponding to the plurality of respective servo sectors and a plurality of target servo reproduction signal strengths corresponding to the high flying heights corresponding to the plurality of respective servo sectors.

The MPU 60 determines whether the target servo reproduction signal strength corresponding to the predetermined servo sector SS is smaller than the reproduction signal strength threshold corresponding to this servo sector SS or is equal to or greater than the reproduction signal strength threshold (or whether to be equal to or less than the reproduction signal strength threshold or larger than the reproduction signal strength threshold). For example, the MPU 60 determines whether the current target servo reproduction signal strength corresponding to the current servo sector SS is smaller than the reproduction signal strength threshold (hereinafter, sometimes referred to as current reproduction signal strength threshold) or equal to or greater than the current reproduction signal strength threshold.

If determining that the target servo reproduction signal strength corresponding to the predetermined servo sector SS is smaller than the reproduction signal strength threshold (or equal to or less than the reproduction signal strength threshold), the MPU 60 determines that HFW occurs in the predetermined region of the disk 10. If determining that the target servo reproduction signal strength corresponding to the predetermined servo sector SS is equal to or greater than the reproduction signal strength threshold (or larger than the reproduction signal strength threshold), the MPU 60 determines that HFW does not occur in the predetermined region of the disk 10. For example, if determining that the current target servo reproduction signal strength corresponding to the current servo sector is smaller than the current reproduction signal strength threshold (or equal to or less than the current reproduction signal strength threshold), the MPU 60 determines that HFW occurs in the predetermined region of the disk 10. If determining that the current target servo reproduction signal strength corresponding to the current servo sector is equal to or greater than the current reproduction signal strength threshold (or larger than the current reproduction signal strength threshold), the MPU 60 determines that HFW does not occur in the predetermined region of the disk 10.

If determining that HFW occurs in a predetermined region of the disk 10, the HFW detection section 630 stops the write operation in the predetermined region of the disk 10. For example, if determining that HFW occurs in a predetermined region of the disk 10, the HFW detection section 630 stops the write operation in the predetermined region of the disk 10 and executes rewrite processing on the predetermined region of the disk 10. For example, if determining that HFW occurs in the predetermined region of the disk 10, the HFW detection section 630 stops the write operation in the predetermined region of the disk 10, and executes processing (hereinafter, sometimes referred to as saving processing) of recording or storing data in the predetermined region of the disk 10 in another alternative region, for example, the disk 10, the volatile memory 70, the nonvolatile memory 80, or the buffer memory 90.

Figure 20:
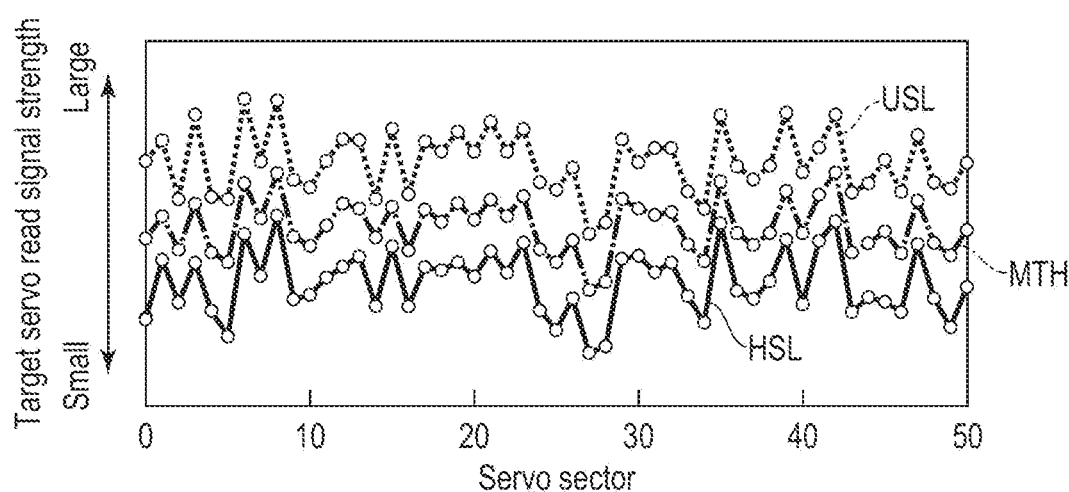
FIG. 20 is a schematic view illustrating an example of a change in each reproduction signal strength threshold with respect to each servo sector according to the second embodiment.

FIG. 20 is a schematic view illustrating an example of a change in each reproduction signal strength threshold with respect to each servo sector SS according to the second embodiment. In FIG. 20, the horizontal axis represents the servo sector SS, and the vertical axis represents the target servo reproduction signal strength. In the vertical axis of FIG. 20, the target servo reproduction signal strength increases toward the tip side of the large arrow, and decreases toward the tip side of the small arrow. FIG. 20 illustrates a change (hereinafter, sometimes referred to as change in the reproduction signal strength threshold) MTH of each reproduction signal strength threshold with respect to each servo sector corresponding to an intermediate value between the change USL in the target servo reproduction signal strength corresponding to the normal flying height and the change HSL in the target servo reproduction signal strength corresponding to the high flying height.

As indicated by the change MTH of the reproduction signal strength threshold in FIG. 20, each reproduction signal strength threshold corresponding to each servo sector SS corresponds to an intermediate value between the target servo reproduction signal strength corresponding to each high flying height in each servo sector and the target servo reproduction signal strength corresponding to each normal flying height in each servo sector SS. For example, the MPU 60 has the change MTH in the reproduction signal strength threshold.

Figure 21:
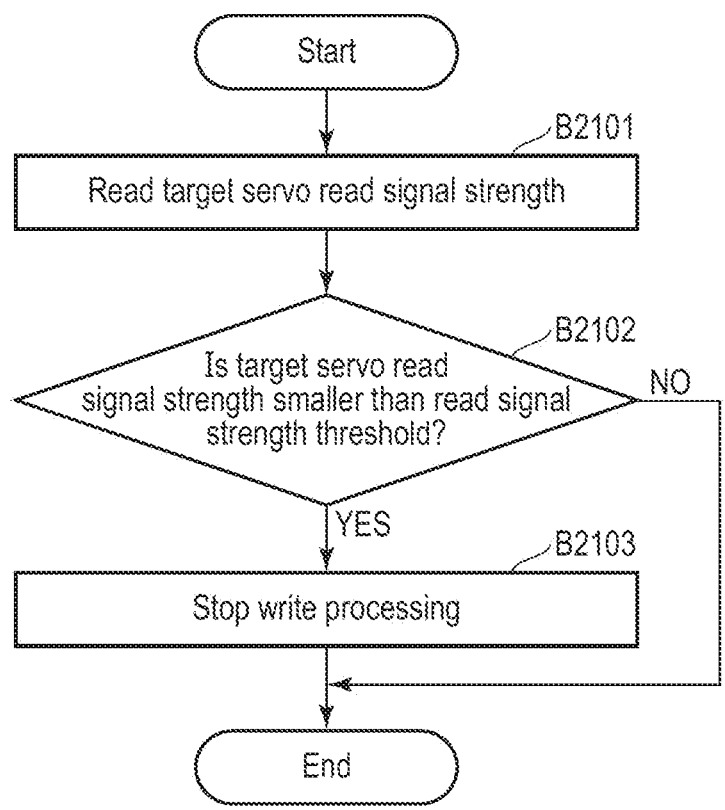
FIG. 21 is a flowchart illustrating an example of an HFW detection method according to the second embodiment.

FIG. 21 is a flowchart illustrating an example of the HFW detection method according to the second embodiment.

The MPU 60 reads the target servo reproduction signal strength of the predetermined servo sector SS during the write processing (B2101). The MPU 60 determines whether the target servo reproduction signal strength corresponding to the predetermined servo sector SS is smaller than the reproduction signal strength threshold corresponding to this servo sector SS or is equal to or greater than the reproduction signal strength threshold (B2102). If determining that the target servo reproduction signal strength corresponding to the predetermined servo sector SS is equal to or greater than the reproduction signal strength threshold (NO in B2102), the MPU 60 determines that HFW does not occur in the predetermined region, and ends the processing. If determining that the target servo reproduction signal strength corresponding to the predetermined servo sector SS is smaller than the reproduction signal strength threshold (YES in B2102), the MPU 60 determines that HFW occurs in the predetermined region, stops the write processing in this region (B2103), and ends the processing.

According to the second embodiment, the magnetic disk device 1 reads the target servo reproduction signal strength of the predetermined servo sector SS during the write processing. The magnetic disk device 1 determines whether the target servo reproduction signal strength corresponding to the predetermined servo sector SS is smaller than the reproduction signal strength threshold corresponding to this servo sector SS or is equal to or greater than the reproduction signal strength threshold. If determining that the target servo reproduction signal strength corresponding to the predetermined servo sector SS is smaller than the reproduction signal strength threshold, the magnetic disk device 1 determines that HFW occurs in the predetermined region, stops the write processing in this region, and ends the processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of a magnetic disk device obtained from the configuration disclosed in the present description will be additionally described below.

(1)

A magnetic disk device including:

a disk that has a track including a first servo sector and a second servo sector that is different from the first servo sector;

a head that writes data to the disk and reads data from the disk; and a controller that records first signal strength record data related to a signal strength at which first target servo data that is a target of the first servo sector is read, and standardizes first signal strength data related to a signal strength at which the first target servo data is read when the first target servo data is read.

(2)

The magnetic disk device according to (1), in which the controller standardizes the first signal strength data to first standardized data based on the first signal strength record data.

(3)

The magnetic disk device according to (1), in which the controller calculates first standardized data by subtracting or dividing the first signal strength record data from the first signal strength data.

(4)

The magnetic disk device according to (2) or (3), in which the controller determines whether the first standardized data is smaller than a first threshold or equal to or greater than the first threshold.

(5)

The magnetic disk device according to (4), in which the controller stops write processing in a case of determining that the first standardized data is smaller than the first threshold.

(6)

The magnetic disk device according to (4), in which the controller stops write processing in a case of determining that the first standardized data is equal to or greater than the first threshold.

(7)

The magnetic disk device according to (5) or (6), in which the controller executes rewrite processing or writes to another alternative region in a case of stopping write processing.

(8)

The magnetic disk device according to any one of (1) to (7), in which the controller writes the first signal strength record data adjacent to the first servo sector between the first servo sector and the second servo sector arranged next to the first servo sector.

(9)

The magnetic disk device according to (7) further including
a volatile memory and a nonvolatile memory, in which the alternative region has the disk, the volatile memory, or the nonvolatile memory.

(10)

The magnetic disk device according to any one of (1) to (9), in which the first signal strength record data and the first signal strength data are values obtained by performing Fourier transform of a reproduction signal when the first target servo data is read.

(11)

The magnetic disk device according to any one of (1) to (9), in which the first signal strength record data and the first signal strength data are values obtained by performing Fourier transform on and dividing a reproduction signal and an ideal signal or a demodulated signal when the first target servo data is read.

(12)

The magnetic disk device according to any one of (1) to (9), in which the first signal strength record data and the first signal strength data are amplitude of a reproduction signal when the first target servo data is read.

(13)

The magnetic disk device according to (1), in which the controller records second signal strength record data related to a signal strength at which second target servo data that is a target of the second servo sector is read, calculates first averaged signal strength record data in which the first signal strength record data and the second signal strength record data are averaged when the first target servo data is read, calculates first averaged signal strength data in which the first signal strength data and the second signal strength data related to a signal strength at which the second target servo data is read are averaged, and standardizes the first averaged signal strength data to first averaged standardized data based on the first averaged signal strength record data.

(14)

The magnetic disk device according to (13), in which the controller executes rewrite processing on a first data region corresponding to the first servo sector and a second data region corresponding to the second servo sector in a case of stopping write processing based on the first averaged standardized data.

(15)

The magnetic disk device according to (13) or (14), in which the controller determines whether the first averaged standardized data is smaller than a first threshold or equal to or greater than the first threshold.

(16)

The magnetic disk device according to (1), in which the controller records second signal strength record data related to a signal strength at which second target servo data that is a target of the second servo sector is read, standardizes the first signal strength data to first standardized data based on the first signal strength record data when the first target servo data is read, standardizes, to second standardized data, second signal strength data related to a signal strength at which the second target servo data is read based on the second signal strength record data when the second target servo data is read, and calculates first averaged standardized data at which the first standardized data and the second standardized data are averaged.

(17)

The magnetic disk device according to (16), in which the controller executes rewrite processing on a first data region corresponding to the first servo sector and a second data region corresponding to the second servo sector in a case of stopping write processing based on the first averaged standardized data.

(18)

The magnetic disk device according to (1), in which
the head has a first read head and a second read head that read data from the disk, and
when the first target servo data is read by the first read head and the second read head, the controller calculates first averaged signal strength record data in which the first signal strength record data in which the first target servo data is read by the first read head and second signal strength record data related to a signal strength at which the first target servo data is read by the second read head are averaged, calculates first averaged signal strength data in which the first signal strength data read from the first target servo data by the first read head and second signal strength data related to a signal strength read from the first target servo data by the second read head are averaged, and standardizes the first averaged signal strength data to first averaged standardized data based on the first averaged signal strength record data.

(19)

A magnetic disk device including:
a disk that has a track including a first servo sector and a second servo sector that is different from the first servo sector;
a head that writes data to the disk and reads data from the disk; and a controller that determines whether first signal strength data related to a signal strength at which first target servo data that is a target of the first servo sector is read is smaller than a first threshold corresponding to the first signal strength data or equal to or greater than the first threshold when the first target servo data is read.

(20)

The magnetic disk device according to (19), in which the controller stops write processing in a case of determining that the first signal strength data is smaller than the first threshold.

(21)

The magnetic disk device according to (19) or (20), in which the first threshold corresponds to an intermediate value between the first signal strength data when the head reads the first servo sector with a first flying height and the first signal strength data when the head reads the first servo sector with a second flying height higher than the first flying height.

(22)

The magnetic disk device according to (19), in which the controller calculates the first threshold by averaging the first signal strength data and second signal strength data related to a signal strength at which second target servo data that is a target of the second servo sector is read when the second target servo data is read.

(23)

A magnetic disk device including:
a disk that has a track including a first servo sector and a second servo sector that is different from the first servo sector;
a head that writes data to the disk and reads data from the disk; and
a controller that records first averaged signal strength record data in which signal strength a signal strength at which first target servo data that is a target of the first servo sector is read and a signal strength at which second target servo data that is a target of the second servo sector is read are averaged, and standardizes, to first standardized data, first signal strength data related to a signal strength at which the first target servo data is read when the first target servo data is read.

(24)

The magnetic disk device according to (23), in which the controller standardizes the first signal strength data to the first standardized data based on the first averaged signal strength record data.

(25)

The magnetic disk device according to (23) or (24), in which the controller executes rewrite processing on a first data region corresponding to the first servo sector and a second data region corresponding to the second servo sector in a case of stopping write processing based on the first averaged standardized data.

What is claimed is:

1. A magnetic disk device comprising:
a disk that has a track comprising a first servo sector and a second servo sector that is different from the first servo sector;
a head that writes data to the disk and reads data from the disk; and
a controller that records first signal strength record data related to a signal strength at which first target servo data that is a target of the first servo sector is read, and standardizes first signal strength data related to a signal strength at which the first target servo data is read when the first target servo data is read,
wherein
the controller writes the first signal strength record data adjacent to the first servo sector between the first servo sector and the second servo sector arranged next to the first servo sector.

2. The magnetic disk device of claim 1, wherein
the controller standardizes the first signal strength data to first standardized data based on the first signal strength record data.

3. The magnetic disk device of claim 1, wherein
the controller calculates first standardized data by subtracting or dividing the first signal strength record data from the first signal strength data.

4. The magnetic disk device of claim 2, wherein
the controller determines whether the first standardized data is smaller than a first threshold or equal to or greater than the first threshold.

5. The magnetic disk device of claim 4, wherein
the controller stops write processing in a case of determining that the first standardized data is smaller than the first threshold.

6. The magnetic disk device of claim 4, wherein
the controller stops write processing in a case of determining that the first standardized data is equal to or greater than the first threshold.

7. The magnetic disk device of claim 5, wherein
the controller executes rewrite processing or writes to another alternative region in a case of stopping write processing.

8. The magnetic disk device of claim 7, further comprising:
a volatile memory and a nonvolatile memory,
wherein
the alternative region has the disk, the volatile memory, or the nonvolatile memory.

9. The magnetic disk device of claim 1, wherein
the first signal strength record data and the first signal strength data are values obtained by performing Fourier transform of a reproduction signal when the first target servo data is read.

10. The magnetic disk device of claim 1, wherein
the first signal strength record data and the first signal strength data are values obtained by performing Fourier transform on and dividing a reproduction signal and an ideal signal or a demodulated signal when the first target servo data is read.

11. The magnetic disk device of claim 1, wherein
the first signal strength record data and the first signal strength data are amplitude of a reproduction signal when the first target servo data is read.

12. A magnetic disk device comprising:
a disk that has a track comprising a first servo sector and a second servo sector that is different from the first servo sector;
a head that writes data to the disk and reads data from the disk; and
a controller that records first signal strength record data related to a signal strength at which first target servo data that is a target of the first servo sector is read, and standardizes first signal strength data related to a signal strength at which the first target servo data is read when the first target servo data is read,
wherein
the controller records second signal strength record data related to a signal strength at which second target servo data that is a target of the second servo sector is read, calculates first averaged signal strength record data in which the first signal strength record data and the second signal strength record data are averaged when the first target servo data is read, calculates first averaged signal strength data in which the first signal strength data and the second signal strength data related to a signal strength at which the second target servo data is read are averaged, and standardizes the first averaged signal strength data to first averaged standardized data based on the first averaged signal strength record data.

13. The magnetic disk device of claim 12, wherein the controller executes rewrite processing on a first data region corresponding to the first servo sector and a second data region corresponding to the second servo sector in a case of stopping write processing based on the first averaged standardized data.

14. The magnetic disk device of claim 12, wherein the controller determines whether the first averaged standardized data is smaller than a first threshold or equal to or greater than the first threshold.

15. A magnetic disk device comprising:

a disk that has a track comprising a first servo sector and a second servo sector that is different from the first servo sector;

a head that writes data to the disk and reads data from the disk; and a controller that records first signal strength record data related to a signal strength at which first target servo data that is a target of the first servo sector is read, and standardizes first signal strength data related to a signal strength at which the first target servo data is read when the first target servo data is read, wherein the controller records second signal strength record data related to a signal strength at which second target servo data that is a target of the second servo sector is read, standardizes the first signal strength data to first standardized data based on the first signal strength record data when the first target servo data is read, standardizes, to second standardized data, second signal strength data related to a signal strength at which the second target servo data is read based on the second signal strength record data when the second target servo data is read, and calculates first averaged standardized data at which the first standardized data and the second standardized data are averaged.

16. The magnetic disk device of claim 15, wherein the controller executes rewrite processing on a first data region corresponding to the first servo sector and a second data region corresponding to the second servo sector in a case of stopping write processing based on the first averaged standardized data.

17. A magnetic disk device comprising:

a disk that has a track comprising a first servo sector and a second servo sector that is different from the first servo sector;

a head that writes data to the disk and reads data from the disk; and a controller that records first signal strength record data related to a signal strength at which first target servo data that is a target of the first servo sector is read, and standardizes first signal strength data related to a signal strength at which the first target servo data is read when the first target servo data is read, wherein the head has a first read head and a second read head that read data from the disk, and when the first target servo data is read by the first read head and the second read head, the controller calculates first averaged signal strength record data in which the first signal strength record data in which the first target servo data is read by the first read head and second signal strength record data related to a signal strength at which the first target servo data is read by the second read head are averaged, calculates first averaged signal strength data in which the first signal strength data read from the first target servo data by the first read head and second signal strength data related to a signal strength read from the first target servo data by the second read head are averaged, and standardizes the first averaged signal strength data to first averaged standardized data based on the first averaged signal strength record data.

* * * * *